(12) United States Patent
Dhamnani et al.

(10) Patent No.: US 11,704,591 B2
(45) Date of Patent: Jul. 18, 2023

(54) FAST AND ACCURATE RULE SELECTION FOR INTERPRETABLE DECISION SETS

(71) Applicant: Adobe Inc., San Jose, CA (US)

(72) Inventors: Sunny Dhamnani, Bangalore (IN); Dhruv Singal, New York, NY (US); Ritwik Sinha, Kolkata (IN)

(73) Assignee: ADOBE INC., San Jose, CA (US)

( * ) Notice: Subject to any disclaimer, the term of this patent is extended or adjusted under 35 U.S.C. 154(b) by 1026 days.

(21) Appl. No.: 16/353,076

(22) Filed: Mar. 14, 2019

(65) Prior Publication Data
US 2020/0293836 A1 Sep. 17, 2020

(51) Int. Cl.
*G06N 20/00* (2019.01)
*G06N 5/025* (2023.01)
*G06F 16/901* (2019.01)
*G06F 18/243* (2023.01)
*G06F 18/2115* (2023.01)
*G06N 7/01* (2023.01)

(52) U.S. Cl.
CPC ......... *G06N 20/00* (2019.01); *G06F 16/9014* (2019.01); *G06F 18/2115* (2023.01); *G06F 18/24323* (2023.01); *G06N 5/025* (2013.01); *G06N 7/01* (2023.01)

(58) Field of Classification Search
CPC ............... G06K 9/6282; G06K 9/6231; G06F 16/9014; G06N 5/025; G06N 20/00; G06N 7/005
See application file for complete search history.

(56) References Cited

U.S. PATENT DOCUMENTS

| | | |
|---|---|---|
| 8,126,911 B2 | 2/2012 | Hu et al. |
| 11,200,501 B2 | 12/2021 | Sinha et al. |
| 2004/0225629 A1 | 11/2004 | Eder |

(Continued)

OTHER PUBLICATIONS

Lakkaraju, H., Bach, S.H. and Leskovec, J., Aug. 2016. Interpretable decision sets: A joint framework for description and prediction. In Proceedings of the 22nd ACM SIGKDD international conference on knowledge discovery and data mining (pp. 1675-1684).*

(Continued)

*Primary Examiner* — Zhitong Chen
(74) *Attorney, Agent, or Firm* — Kilpatrick Townsend & Stockton LLP

(57) ABSTRACT

An IDS generator determines multiple classes for electronic data items. The IDS generator determines, for each class, a class-specific candidate ruleset. The IDS generator performs a differential analysis of each class-specific candidate ruleset. The differential analysis is based on differences between result values of a scoring objective function. In some cases, the differential analysis determines at least one of the differences based on additional data structures, such as an augmented frequent-pattern tree. A probability function based on the differences is compared to a threshold probability At least one testing ruleset is modified based on the comparison. The IDS generator determines, for each class, a class-specific optimized ruleset based on the differential analysis of each class-specific candidate ruleset. The IDS generator creates an optimized interpretable decision set based on combined class-specific optimized rulesets for the multiple classes.

17 Claims, 5 Drawing Sheets

(56) References Cited

U.S. PATENT DOCUMENTS

| | | |
|---|---|---|
| 2006/0184473 A1 | 8/2006 | Eder |
| 2007/0250522 A1 | 10/2007 | Perrizo |
| 2009/0171954 A1 | 7/2009 | Liu et al. |
| 2011/0212717 A1 | 9/2011 | Rhoads et al. |
| 2014/0156799 A1 | 6/2014 | Zhang et al. |
| 2014/0201126 A1 | 7/2014 | Zadeh et al. |
| 2015/0006286 A1 | 1/2015 | Liu et al. |
| 2016/0019587 A1 | 1/2016 | Hueter et al. |
| 2016/0034305 A1 | 2/2016 | Shear et al. |
| 2016/0196587 A1 | 7/2016 | Eder |
| 2017/0124269 A1* | 5/2017 | McNair ................. G16H 50/20 |
| 2017/0308791 A1 | 10/2017 | Jiao et al. |
| 2017/0364819 A1 | 12/2017 | Yang |
| 2018/0001184 A1 | 1/2018 | Tran et al. |
| 2019/0065343 A1 | 2/2019 | Li et al. |

OTHER PUBLICATIONS

Aggarwal, C.C., Bhuiyan, M.A. and Hasan, M.A., 2014. Frequent pattern mining. Springer, Cham.*

U.S. Appl. No. 15/837,929, Notice of Allowance dated Aug. 3, 2021, 18 pages.

U.S. Appl. No. 15/837,929 , "Corrected Notice of Allowability", dated Nov. 18, 2021, 14 pages.

"IBM on Mitigating Bias in ML", https://www.ibm.com/blogs/research/2018/02/mitigating-bias-ai-models.

"Microsoft Research on Intelligible, Interpretable, and Transparent Machine Learning", https://www.microsoft.com/en-us/research/project/intelligible-interpretable-and-transparent-machine-learning.

Agrawal et al., "Mining Association Rules Between Sets of Items in Large Databases", IBM Almaden Research Center, Available online at: https://doi.org/10.1145/170035.170072, May 1993, pp. 207-216.

Amershi et al., "ModelTracker: Redesigning Performance Analysis Tools for Machine Learning", Microsoft Research, Available online at: https://dl.acm.org/citation.cfm?doid=2702123.2702509, Apr. 18-23, 2015, 10 pages.

Bergstra et al., "Algorithms for Hyper-Parameter Optimization", Advances in Neural Information Processing Systems, Available online at: https://papers.nips.ee/paper/4443-algorithms-for-hyper-parameter-optimization.pdf, Dec. 12-15, 2011, pp. 1-9.

Bergstra et al., "Hyperopt: A Python Library for Optimizing the Hyperparameters of Machine Learning Algorithms", Proc. of the 12th Python in Science Conf., Available online at: https://conference.scipy.org/proceedings/scipy2013/pdfs/bergstra_hyperopt.pdf, Jan. 2013, pp. 13-20.

Bertsimas et al., "Ordered Rules for Classification: A Discrete Optimization Approach to Associative Classification", Operations Research Center, Available online at: https://dspace.mit.edu/bitstream/handle/1721.1/73166/OR386-11.pdf?sequence=4, 2012, pp. 1-31.

Borgelt , "An Implementation of the FP-Growth Algorithm", In Proceedings of the 1st International Workshop on Open Source Data Mining: Frequent Pattern Mining Implementations, ACM, Available online at: http://www.borgelt.net/papers/fpgrowth.pdf, Aug. 21, 2005, pp. 1-5.

Borgelt , "Frequent Item Set Mining", Wiley Interdisciplinary Reviews: Data Mining and Knowledge Discovery, vol. 2, No. 6, Nov.-Dec. 2012, pp. 437-456.

Breiman et al., "Classification and Regression Trees", Chapman & Hall/CRC, 2017, 31 pages.

Breiman , "Random Forests", Machine Learning, vol. 45, No. 1, Jan. 2001, pp. 5-32.

Buchbinder et al., "A Tight Linear Time (1/2)—Approximation for Unconstrained Submodular Maximization", Society for Industrial and Applied Mathematics, vol. 44, No. 5, Oct. 27, 2015, pp. 1384-1402.

Buchbinder et al., "A Tight Linear Time (1/2)—Approximation for Unconstrained Submodular Maximization", IEEE 53rd Annual Symposium on Foundations of Computer Science, 2012, pp. 649-658.

Cheng et al., "Discriminative Frequent Pattern Analysis for Effective Classification", IEEE 23rd International Conference on Data Engineering, 2007, pp. 716-725.

Clark et al., "The CN2 Induction Algorithm", Machine Learning, vol. 3, No. 4, Available online at: https://rd.springer.com/content/pdf/10.1023%2FA%3A1022641700528.pdf, 1989, pp. 261-283.

Dheeru et al., "UCI Machine Learning Repository", Available online at: http://archive.ics.uci.edu/ml/index.php, Accessed from Internet at Mar. 22, 2019, 2 pages.

Doshi-Velez et al., "Towards a Rigorous Science of Interpretable Machine Learning", Available online at: https://arxiv.org/pdf/1702.08608.pdf, Mar. 2, 2017, pp. 1-13.

Eggensperger et al., "Towards an Empirical Foundation for Assessing Bayesian Optimization of Hyperparameters", In NIPS workshop on Bayesian Optimization in Theory and Practice, vol. 10, No. 3, Available online at: https://ml.informatik.uni-freiburg.de/papers/13-BayesOpt_EmpiricalFoundation.pdf, 2013, pp. 1-5.

Feige et al., "Maximizing Non-Monotone Submodular Functions", SIAM Journal on Computing, vol. 40, No. 4, Available online at: https://epubs.siam.org/doi/10.1137/090779346, Jul. 2011, pp. 1133-1153.

Feige et al., "Maximizing Non-Monotone Submodular Functions", Proceeding FOCS '07 Proceedings of the 48th Annual IEEE Symposium on Foundations of Computer Science, Apr. 19, 2007, pp. 1-17.

Friedman , "Greedy Function Approximation: A Gradient Boosting Machine", The Annals of Statistics, vol. 29, No. 5, Oct. 2001, pp. 1189-1232.

Friedman , "Stochastic Gradient Boosting", Computational Statistics & Data Analysis, vol. 38, No. 4, Feb. 28, 2002, pp. 367-378.

Guidotti et al., "A Survey of Methods for Explaining Black Box Models", ACM Computing Surveys, vol. 51, No. 5, Available online at: https://arxiv.org/pdf/1802.01933.pdf, Jun. 21, 2018, 45 pages.

Guidotti et al., "Local Rule-Based Explanations of Black Box Decision Systems", Available online at: https://arxiv.org/pdf/1805.10820.pdf, May 28, 2018, 10 pages.

Han et al., "Mining Frequent Patterns Without Candidate Generation", Proceeding SIGMOD '00 Proceedings of the 2000 ACM SIGMOD International Conference on Management of Data, vol. 29, No. 2, Available online at: https://dl.acm.org/citation.cfm?doid=342009.335372, May 15-18, 2000, pp. 1-12.

Hofman et al., "Prediction and Explanation in Social Systems", Science, vol. 355, No. 6324, Available online at: http://science.sciencemag.org/content/sci/355/6324/486.full.pdf, Feb. 3, 2017, pp. 486-488.

Hosmer et al., "Applied Logistic Regression", 2nd Edition, John Wiley & Sons, vol. 398, 2013, 18 pages.

Koh et al., "Understanding Black-Box Predictions via Influence Functions", In ICML, Available online at: https://arxiv.org/pdf/1703.04730.pdf, Jul. 10, 2017, 11 pages.

Lakkaraju , "Interpretable & Explorable Approximations of Black Box Models", KDD'17, Available online at: https://arxiv.org/pdf/1707.01154.pdf, Jul. 4, 2017, 5 pages.

Lakkaraju , "Interpretable Decision Sets", GitHub, Available online at: https://github.com/lvhimabindu/interpretable_decision_sets, Accessed from Internet at Mar. 22, 2019, 1 page.

Lakkaraju et al., "Interpretable Decision Sets: A Joint Framework for Description and Prediction", Proceeding KDD '16 Proceedings of the 22nd ACM SIGKDD International Conference on Knowledge Discovery and Data Mining, Available online at: https://dl.acm.org/citation.cfm?doid=2939672.2939874, Aug. 13-17, 2016, pp. 1675-1684.

Letham et al., "Interpretable Classifiers using Rules and Bayesian Analysis: Building a Better Stroke Prediction Model", The Annals of Applied Statistics, vol. 9, No. 3, Available online at: https://arxiv.org/pdf/1511.01644.pdf, Nov. 5, 2015, 23 pages.

Liu et al., "Integrating Classification and Association Rule Mining", Proceeding KDD'98 Proceedings of the Fourth International Conference on Knowledge Discovery and Data Mining, Available online at: http://alpha.luc.ac.be/~brijs/pubs/cba2003a.pdf, Aug. 27-31, 1998, pp. 80-86.

(56) References Cited

OTHER PUBLICATIONS

O'Neil et al., "Weapons of Math Destruction: How Big Data Increases Inequality and Threatens Democracy", Broadway Books, 2016, 204 pages.

Pedregosa et al., "Scikit-Learn: Machine Learning in Python", Journal of Machine Learning Research, vol. 12, Oct. 2011, pp. 2825-2830.

Quinlan, "C4.5: Programs for Machine Learning", Elsevier, 2014.

Ribeiro et al., "Anchors: Highprecision Model-Agnostic Explanations", In AAAI Conference on Artificial Intelligence, Available online at: https://homes.cs.washington.edu/~marcotcr/aaai18.pdf, 2018, 9 pages.

Ribeiro et al., "Nothing Else Matters: Model-Agnostic Explanations by Identifying Prediction Invariance", 30th Conference on Neural Information Processing Systems, NIPS, Available online at: https://arxiv.org/pdf/1611.05817.pdf, Nov. 17, 2016, 5 pages.

Ribeiro et al., "Why Should I Trust You?: Explaining the Predictions of Any Classifier", In Proceedings of the 22nd ACM SIGKDD International Conference on Knowledge Discovery and Data Mining, ACM, 2016, pp. 1135-1144.

Rivest et al., "Learning Decision Lists", Machine Learning, vol. 2, No. 3, Available online at: https://people.csail.mit.edu/rivest/pubs/Riv87b.pdf, Nov. 1987, pp. 229-246.

Russakovsky et al., "ImageNet Large Scale Visual Recognition Challenge", International Journal of Computer Vision, vol. 115, No. 3, Jan. 30, 2015, pp. 211-252.

Selvaraju et al., "Grad-CAM: Visual Explanations from Deep Networks via Gradient-Based Localization", In ICCV, Available online at: https://arxiv.org/pdf/1610.02391.pdf, Mar. 21, 2017, pp. 618-626.

Shmueli, "To Explain or to Predict?", Statistical Science, vol. 25, No. 3, Available online at: https://www.stat.berkeley.edu/~aldous/157/Papers/shmueli.pdf, 2010, pp. 289-310.

Sinha et al., "Forecasting Granular Audience Size for Online Advertising", In Proceedings of the ADKDD'18, ACM, Available online at: https://arxiv.org/pdf/1901.02412.pdf, 2018, 6 pages.

Vellido et al., "Making Machine Learning Models Interpretable", In ESANN, vol. 12, Citeseer, Available online at: https://www.elen.ucl.ac.be/Proceedings/esann/esannpdf/es2012-7.pdf, Apr. 25-27, 2012, pp. 163-172.

Zaki et al., "New Algorithms for Fast Discovery of Association Rules", KDD-97 Proceedings, Computer Science Department, 1997, pp. 283-286.

Zhang et al., "Deep Learning Over Multi-Field Categorical Data—A Case Study on User Response Prediction", Springer International Publishing Switzerland, 2016, pp. 45-57.

Zhang et al., "Interpretable Convolutional Neural Networks", vol. 2, No. 3, Available online at: https://arxiv.org/pdf/1710.00935.pdf, 2017, 14 pages.

Zhang et al., "Understanding Deep Learning Requires Rethinking Generalization", Available online at: https://arxiv.org/pdf/1611.03530.pdf, 2016, 15 pages.

Zhang et al., "Visual Interpretability for Deep Learning: A Survey", Frontiers of Information Technology & Electronic Engineering, vol. 19, No. 1, Available online at: https://arxiv.org/pdf/1802.00614.pdf, Feb. 7, 2018, pp. 27-39.

"Email Marketing Software Customized Solutions", Available Online at: https://www.marketingcloud.com/products/audiences/audience-segmentation, 2018, 10 pages.

"Watson Marketing Engage and Understand Your Customer at Scale, Wherever They Are", Available online at: https://www.ibm.com/think/marketing/a-marketers-guide-to-customersegmentation, May 2018, 6 pages.

Chegg, "Saving Broke Students One Textbook at a Time", First accessed Apr. 27, 2017 and Jun. 14, 2019, 4 pages.

U.S. Appl. No. 15/837,929, First Action Interview Pilot Program Pre-Interview Communication dated Mar. 30, 2021, 5 pages.

Ghorashi et al., A Frequent Pattern Mining Algorithm for Feature Extraction of Customer Reviews, Semantic Scholar, AI-Powered Research Tool, Available Online at: https://citeseerx.ist.psu.edu/viewdoc/download?doi=10.1.1.435.5906&rep=rep1&type=pdf, Jul. 2012, 7 pages.

Hong et al., Incrementally Fast Updated Frequent Pattern Trees, ScienceDirect.com, Science, Health and Medical Journals, Full Text Articles and Books, vol. 34, Issue 4, Available Online at: https://www.sciencedirect.com/science/article/pii/S0957417407001352, 2008, pp. 2424-2435.

Narvekar et al., An Optimized Algorithm for Association Rule Mining Using FP Tree, Science Direct.com, Science, Health and Medical Journals, Full Text Articles and Books, Available Online at: https://www.sciencedirect.com/science/article/pii/S1877050915003336, Mar. 26, 2015, pp. 101-110.

Silipo et al., Customer Segmentation Comfortably from a Web Browser, KNIME, Available Online at: https://www.knime.com/blog/customer-segmentation-comfortably-from-a-web-browser, 2016, 7 pages.

U.S. Appl. No. 17/519,935, "Non-Final Office Action", dated Jan. 13, 2023, 14 pages.

* cited by examiner

FAST AND ACCURATE RULE SELECTION FOR INTERPRETABLE DECISION SETS

TECHNICAL FIELD

This disclosure relates generally to the field of machine learning, and more specifically relates to determining rules in an interpretable decision set used by machine-learning systems and applications.

BACKGROUND

Computing systems that implement machine-learning models are trained to make decisions based on various models, including statistical models, neural networks, and decision rulesets. In some cases, computing systems that implement machine-learning models provide decisions more quickly, more efficiently, or more accurately than a human decision-maker.

However, machine-learning models are often trained for accuracy of the ultimate result rather than understandability of the process that led to the result. For instance, a "black box" model provides an output result without providing information about how the result is reached, and a human auditor may be unable to determine what criteria were applied by the black box model in generating the result. While some contemporary machine-learning models use interpretable decision sets to provide output based on understandable and auditable criteria, contemporary techniques used to generate an interpretable decision set ("IDS") are computationally intensive, requiring extensive time or computing resources. In addition, the contemporary IDS techniques are limited in practical applications, such as applications that are not time sensitive or that use relatively small datasets. For example, based on a relatively small dataset of up to approximately 150,000 data points, a contemporary IDS generator provides an IDS within a relatively small amount of time (e.g., within one hour). However, based on a larger dataset (e.g., larger than approximately 150,000 data points), the contemporary IDS generator is unable to provide an IDS in a relatively small amount of time (e.g., within one hour). Such limitations exclude contemporary IDS generators from practical applications in the field of data science. It is therefore desirable to develop machine-learning techniques that can more efficiently utilize computing resources while still providing accurate outputs based on processes and criteria that are understandable.

SUMMARY

According to certain embodiments, an interpretable decision set generator can rapidly and accurately generate an IDS. In one example, the IDS generator determines multiple classes for a group of electronic data items. Each class includes a subset of the data items. In a particular class, each data item in the class meets a condition (such as a condition indicated by one or more rules). The condition indicates an attribute value for each of the data items in the class. The IDS generator generates, for each of the multiple classes, a class-specific optimized ruleset by determining a class-specific candidate ruleset. The class-specific candidate ruleset includes candidate rules with at least one additional condition.

Continuing with this example, the IDS generator iterates through each candidate rule to perform a differential analysis of each class-specific candidate ruleset (e.g., for each class). For a given class and its associated candidate ruleset, the differential analysis involves analyzing differences in result values of a scoring objective function based on multiple testing rulesets that are analyzed with and without the candidate rule in a testing update. In some cases, the differential analysis determines a difference between result values based on additional data structures, such as an augmented frequent-pattern tree, and without performing computationally intensive calculations to determine the result values themselves. The IDS generator computes a threshold performance impact based on the differences. In some cases, the IDS generator determines whether including the candidate rule in a testing update causes the testing ruleset to meet or exceed the threshold performance impact.

Responsive to determining that including the candidate rule in a testing update causes the testing ruleset to meet or exceed the threshold performance impact, one or more of the multiple testing rulesets is modified to include the candidate rule. The differential analysis is used to generate a class-specific optimized ruleset is generated based on the modified testing ruleset. The IDS generator creates an optimized IDS based on combined class-specific optimized rulesets for the multiple classes. In some embodiments, a machine-learning decision system is configured to evaluate additional electronic data items based on the optimized IDS. The machine-learning decision system is further configured to provide one or more outputs in a data science application, such as an output describing the applied optimized IDS or the evaluation of the additional electronic data items.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings, where.

DETAILED DESCRIPTION

Figure 1:
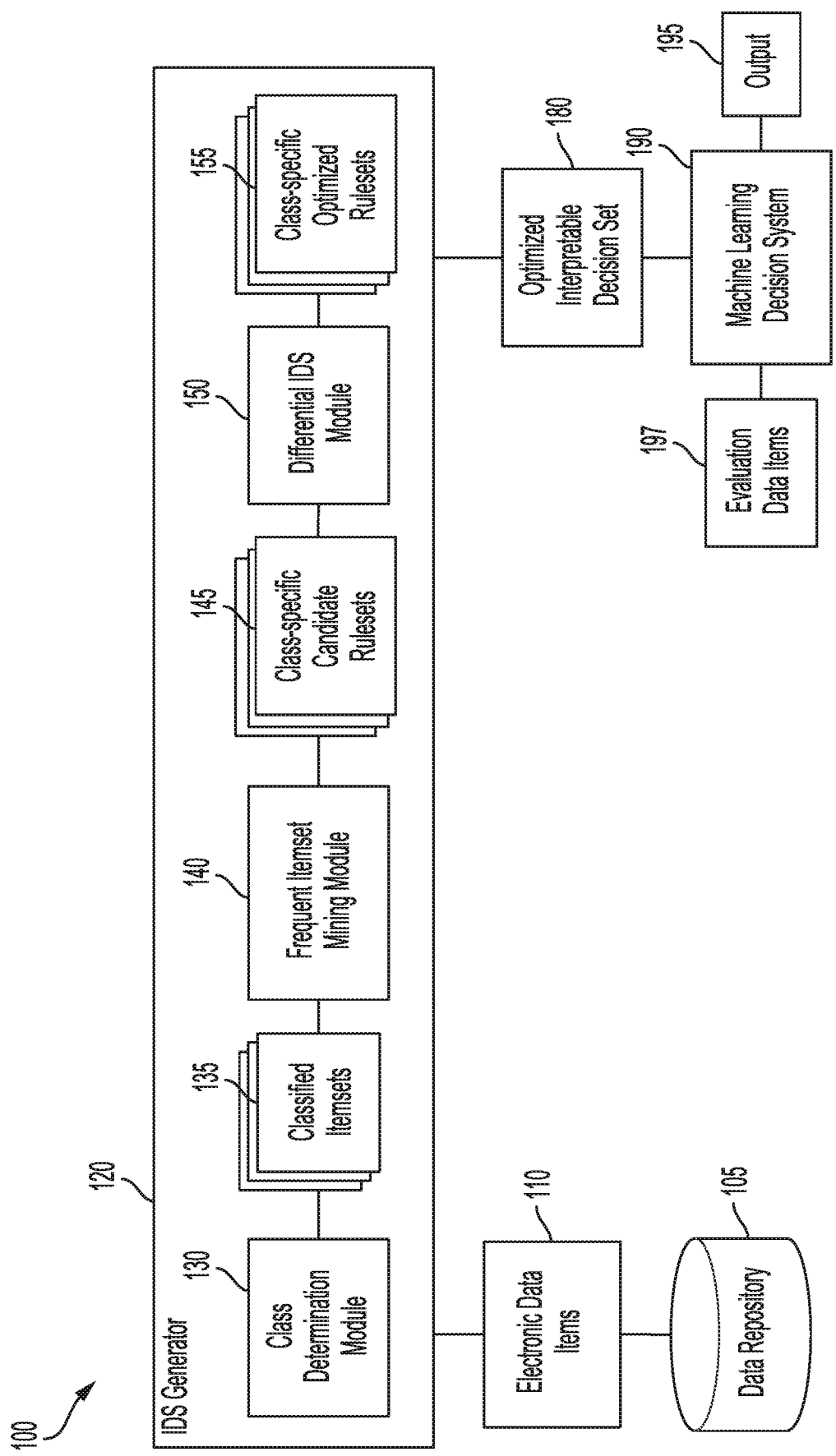
FIG. 1 is a block diagram depicting an example of a computing system in which an optimized interpretable decision set is generated, according to certain embodiments.

As discussed above, existing machine-learning techniques that use black box models do not provide output based on understandable criteria. In addition, contemporary techniques to generate an interpretable decision set ("IDS") require extensive computing resource, including time, processing power, memory, or other computing resources. An IDS includes a set of rules (such as an "if-then" rule) that are understandable to a human reviewer and that are interpretable by a computing system to reach a decision.

Certain embodiments described herein provide for an IDS generator that is capable of rapidly and accurately generating optimized IDS. In some cases, the IDS generator provides an optimized IDS based on relatively large datasets, such as datasets that include at least one million data points. Additionally or alternatively, the IDS generator uses differential analysis techniques and additional data structures to evaluate candidate rules for the optimized IDS. Based on the differential analysis and additional data structures, candidate rules are evaluated by the IDS generator using fewer computing resources than a contemporary IDS generator, enabling the IDS generator to provide the optimized IDS faster and more efficiently as compared to contemporary techniques. A machine-learning decision system that is configured to evaluate data items based on the optimized IDS performs the evaluation more accurately than a decision system that uses an IDS generated by existing systems. Additionally or alternatively, a machine-learning decision system that evaluates data items based on the optimized IDS provides one or more outputs that are auditable, such as an audit by a human reviewer.

The following example is provided to introduce certain embodiments of the present disclosure. In this example, an IDS generator receives a dataset of electronic data items with multiple attributes, such as {age, profession, postal code}. The IDS generator determines classes for the data items based on values of the attributes. For instance, data items could be assigned classes based on certain attribute values of some of the attributes, such as a class in which the attribute {postal code} has the value "12345." The IDS generator generates a set of candidate rules for the data items in each class.

For instance, the class-specific candidate rulesets could be generated based on how often a particular subset of items is found in the class. In one example, an example class for "experienced teachers" could include a subset of data items meeting the attribute conditions {age>45, profession=teacher}. If the data items in the subset occurs more often than a threshold quantity (e.g., a large enough number of data items include {age>45, profession=teacher}), the IDS generator includes a candidate rule {age>45, profession=teacher} in the candidate ruleset for the class "experienced teachers." In addition, attribute conditions for subsets that do not meet the threshold quantity are excluded from the class-specific candidate ruleset. To determine an optimal group of the candidate rules that predict the example class, the candidate rules are evaluated for understandability and accuracy, as described below. If the candidate rule {age>45, profession=teacher} is evaluated to optimize understandability and accuracy, it is included as a rule in an optimized IDS. In some cases, generating a class-specific candidate ruleset improves the accuracy of an optimized IDS that is based on the class-specific candidate ruleset. For example, if a machine-learning decision system uses the optimized IDS to analyze a group of additional data items, the additional data items meeting the rule {age>45, profession=teacher} are correctly classified by the machine-learning decision system as "experienced teachers." Additionally or alternatively, the machine-learning decision system provides an output indicating one or more of the classification of the additional data items as "experienced teachers" or the rule (or rules) by which the additional data items were classified, such as the rule {age>45, profession=teacher}.

Continuing with this example, the IDS generator determines the understandability and the accuracy of each candidate rule in the various class-specific candidate rulesets. For example, the IDS generator evaluates each candidate rule in a given class-specific ruleset based on a scoring objective function that includes multiple terms for evaluating either understandability or accuracy. The IDS generator evaluates each candidate rule by applying the scoring objective function differentially to a class-specific candidate ruleset. For each rule, the IDS generator computes a pair of result values by differentially evaluating the scoring function on a test ruleset with the candidate rule and the test ruleset without the candidate rule. The difference between the result values for a particular candidate rule indicates a differential understandability and a differential accuracy of the candidate rule. If the differential understandability and differential accuracy exceed a threshold, such as a threshold impact on performance, the candidate rule is included in a class-specific optimized ruleset. The IDS generator repeats the evaluation process for each candidate rule and each class-specific optimized ruleset. The class-specific optimized rulesets that include candidate rules with favorable evaluations of understandability and accuracy are combined by the IDS generator into an optimized IDS. A machine-learning decision system for evaluating data items, such as in a data science application, applies the optimized IDS to the received dataset, or to one or more additional datasets that include electronic data items. The machine-learning decision system is configured, for example, to provide one or more auditable outputs indicating the evaluation of the data items. The auditable output indicates, for example, a classification of each data item, one or more rules by which each data item was classified, or other information that is readily interpretable by a human reviewer of the evaluation. In some cases, a machine-learning decision system that uses the optimized IDS evaluates data items more accurately than a decision system using a contemporary IDS, enabling improved accuracy for data item evaluation. Additionally or alternatively, the machine-learning decision system that uses the optimized IDS provides outputs that a more interpretable to a human reviewer than a decision system using a black box model, enabling improved understanding of the outputs by people using the machine-learning decision system.

In this example, the IDS generator determines the differential understandability and differential accuracy based on one or more additional data structures. For instance, the IDS generator determines understandability and accuracy terms of the scoring objective function based on data that are stored in an augmented frequent-pattern tree. Based on the augmented frequent-pattern tree, the understandability and accuracy terms are calculated in a small number of computer processing cycles (e.g., a small operation time, as described elsewhere herein) compared to a larger number of computer processing cycles to fully evaluate the scoring objective function. Therefore, using the augmented frequent-pattern tree reduces computing resources to apply the scoring objective function in some cases, improving the efficiency of the IDS generator.

An IDS generator that generates an optimized IDS can be used with machine-learning models for data science applications in a variety of fields, including computer security, medical research and treatment, and other fields. In many applications, machine-learning decision systems are used to provide rapid and accurate analysis of large sets of data points (e.g., datasets larger than one million data points). However, existing machine-learning decision systems that use black box models could generate results based on criteria that are difficult to interpret. The black box model may include unacceptable criteria, such as criteria that violate legal requirements, ethical behavior, or other standards of acceptable criteria. A person who is reviewing results from the block box model may have a difficult time understanding the criteria, and may be unable to determine whether the criteria from the black box model are acceptable. Additionally or alternatively, existing machine-learning computing systems that use contemporary IDS generate results based on the interpretable rules generated from limited data, such as relatively small datasets. These limitations exclude contemporary IDS generators from practical applications in data science that use relatively large datasets (e.g., greater than one million data points, greater than one billion data points). An IDS generator that evaluates candidate rules based on differential analysis techniques and an augmented frequent-pattern tree data structure, such as described herein, generates an optimized IDS based on relatively large datasets. The described IDS generator is readily usable with machine-learning decision systems to provide rapid and accurate analysis of large sets of data points.

As used herein, the terms "dataset" and "data items" refer to a group of data points represented by one or more electronic data structures. For example, a dataset includes (or otherwise indicates) one or more data points that are represented by alphanumeric characters, database records, electronic documents, or any other suitable electronic representation of a data point. In some cases, a particular data point is represented as a particular data item, such as a particular database record or a particular group of alphanumeric characters.

Additionally or alternatively, a data item represents one or more attributes of a data point. For example, a data point that is based on a person's profession could describe the person's name, age, job title, and college degree. An electronic data item based on this example data point includes attributes indicating the information, such as the attributes {name, age, profession, degree}. Additionally or alternatively, the attributes are assigned values, such as {name=Jane Smith, age=45, profession=science teacher, degree=physics}.

As used herein, the term "class" refers to a set (or subset) of data items that share at least one attribute value. In some cases, a class includes (or is associated with) a group of classified data items. Each data item in the class includes, for example, an attribute having a value that matches the class. For example, a class describing science teachers could include one or more data items with the attributes value {profession=science teacher}.

As used herein, the term "ruleset" refers to one or more rules that describe attribute values for a class. A rule, for example, describes one or more conditions for data items included in the class. Data items that are covered by the rule have attribute values meeting the conditions of the rule. For example, a ruleset for the example class describing science teachers could include the rules {profession=science teacher, degree=physics}, {profession=science teacher, degree=biology}, {profession=science teacher, degree=chemistry}, or other suitable rules. In this example, the example class describing science teachers includes data points that have the "profession" attribute with the value "science teacher" and also have the "degree" attribute with any of the values "physics," "biology," or "chemistry."

As used herein, the terms "machine learning" and "machine-learning" refer to a computing system that is configured to perform data analysis based on automated decision-making techniques. For example, a machine-learning computing system uses one or more models to interpret one or more datasets. Additionally or alternatively, the machine-learning computing system provides recommendations based on the interpreted dataset. Machine-learning models include, for example, black box models, IDS, and other suitable types of models.

As used herein, the terms "interpretable decision set" and "IDS" refer to a set of rules that are executable by a computing system to reach a decision while also being understandable to a human reviewer. In some cases, an IDS includes at least one rule, such as an "if-then" rule, that describes how a data item is interpreted. Additionally or alternatively, an IDS is represented by a data structure, such as a vector, a matrix, a database, or any other suitable data structure. In some cases, an IDS is provided to an additional computing system, such as a machine-learning decision system, that is configured to perform practical data science applications based on the IDS. Examples of practical data science applications include, without limitation, medical research, geological analysis, computer security analysis, or any other suitable practical application.

Referring now to the drawings, FIG. 1 depicts an example of a computing system 100 in which an optimized IDS 180 is generated. The computing system 100 includes an IDS generator 120, one or more sources of data, such as a data repository 105, and one or more subsystems, such as the machine-learning decision system 190, that are configured to execute programming operations based on an input IDS. For example, the machine-learning decision system 190 is configured to apply processing power or other computing resources to improve or assist with data science applications. Additionally or alternatively, the machine-learning decision system 190 is configured to provide data outputs (e.g., related to data science applications) based on one or more IDS received by the machine-learning decision system 190. In some cases, the machine-learning decision system 190 provides such data outputs or other assistance more quickly or more accurately based on an optimized IDS, such as an optimized IDS 180.

In FIG. 1, the IDS generator 120 receives a set of data items, such as electronic data items 110, from the data repository 105. The electronic data items 110 include or otherwise indicate a group of multi-attribute data items, such as data points from a dataset. For example, the electronic data items 110 includes a set of data items, in which each data item has multiple attributes. Additionally or alternatively, each attribute has a respective value. Types of values for the attributes include (without limitation) numeric values; characters; Boolean values (e.g., true/false); vectors or matrices, including multi-dimensional vectors or matrices; data structures, such as database records; a null value, such as an indication that the value has not been entered; or any other suitable type of value.

In some embodiments, the IDS generator 120 determines a class for each data item in the received set of data items. For example, a class determination module 130 that is included in the IDS generator 120 determines a respective class for each data item included in the electronic data items 110. Based on the determined classes, the class determination module 130 generates one or more sets of the classified data items, such as a group of classified itemsets 135. In some cases, the classes of the classified itemsets 135 are determined based on values of one or more attributes of the data items, such as by determining that a particular data item meets all conditions of a particular class. For example, a first data item that has an attribute $\{x_1=8\}$ is assigned to a first example class $\{x_1<20\}$, based on the determination that the first data item meets the condition of the first example class (e.g., 8 is less than 20). In some cases, a class is determined based on values of multiple attributes, such as a second example class $\{x_1<20, x_2=\text{false}\}$, and a data item that meets all of the conditions for the second example class is assigned to the second example class. In FIG. 1, a data item that does not meet the conditions of any class is assigned to a default class. Additionally or alternatively, a data item that meets the conditions of multiple classes is assigned based on a tie-breaking condition, or to the default class, or based on other suitable criteria.

In the IDS generator 120, the IDS generator 120 generates a set of candidate rules for each of the determined classes, based on the data items in each class. In some cases, the IDS generator 120 determines the class-specific candidate rulesets by applying frequent itemset mining ("FIM") to the respective itemset for each class. Additionally or alternatively, determining the class-specific candidate rulesets is based on a threshold quantity of occurrences for the respective itemsets. The occurrence threshold indicates, for instance, how many data items in the itemset should have a particular combination of attribute conditions for the particular combination of conditions to be included as a candidate rule in the class-specific candidate ruleset. In some cases, each candidate ruleset for a respective class is determined based on a respective occurrence threshold for the class.

For example, an FIM module 140 that is included in the IDS generator 120 generates one or more candidate rules for each class, based on the classified itemsets 135 and at least one occurrence threshold. Additionally or alternatively, the FIM module 140 generates, for each classified itemset, a class-specific candidate ruleset, such as a group of class-specific candidate rulesets 145. In some cases, the candidate rules for a particular itemset of the classified itemsets 135 are based on a determination that a quantity of the data items meeting a particular combination of attribute conditions exceeds the occurrence threshold. For example, based on an occurrence threshold of 10, the FIM module 140 determines a class-specific candidate ruleset for the first example class $\{x_1<20\}$. If the first example class $\{x_1<20\}$ includes 40 data points having the attribute value $\{x_1=8\}$ and 5 data points having the attribute value $\{x_1=15\}$, the FIM module 140 determines that $\{x_1=8\}$ is a condition met by a quantity of the data items that meets or exceeds the occurrence threshold (e.g., 40 data points exceeds the threshold of 10). Based on the determination that the condition $\{x_1=8\}$ meets the occurrence threshold, the FIM module generates a candidate rule based on the condition. Additionally or alternatively, the FIM module 140 modifies the class-specific candidate ruleset to include the generated candidate rule. Based on an additional determination that the additional condition $\{x_1=15\}$ is not met by the threshold quantity of data items, the FIM module 140 omits from the class-specific candidate ruleset an additional candidate rule based on the additional condition. In some cases, a candidate rule is based on multiple conditions, such as multiple conditions $\{x_1=8, x_2=\text{false}\}$. Additionally or alternatively, a candidate rule is based on a condition covering a range of attribute values, such as a condition $\{x_1<10\}$.

In some embodiments, the IDS generator 120 generates, for each class, an optimized ruleset that is specific to the respective class, such as a group of class-specific optimized rulesets 155. The class-specific optimized ruleset is based on, for example, the class-specific candidate ruleset associated with the respective class. In some cases, the IDS generator 120 determines the class-specific optimized rulesets 155 by applying a differential calculation, such as a rapid and precise interpretable decision set ("RAPID") analysis technique, to each class-specific candidate ruleset. Additionally or alternatively, the IDS generator 120 determines the class-specific optimized rulesets 155 based on one or more of a differential understandability or a differential accuracy that are determined during the RAPID analysis technique. For example, a differential IDS module 150 that is included in the IDS generator 120 generates the class-specific optimized rulesets 155 on each respective class-specific candidate ruleset included in the class-specific candidate rulesets 145. Additionally or alternatively, the class-specific optimized rulesets 155 include one or more interpretable rules that maximize the differential understandability and differential accuracy. In some cases, an optimized IDS, such as the optimized IDS 180, is generated based on a combination of the class-specific optimized rulesets 155. The optimized IDS 180 includes, for example, interpretable rules that are based on the electronic data items 110. Additionally or alternatively, the optimized IDS 180 includes interpretable rules that are relevant to at least one class of the electronic data items 110, such as an interpretable rule that is based on attribute conditions for a quantity of data items exceeding the occurrence threshold.

In the computing system 100, the optimized IDS 180 is received by the machine-learning decision system 190. Based on the optimized IDS 180, the machine-learning decision system 190 provides information relevant to a data science application. For example, the machine-learning decision system 190 is configured to provide information for the data science application by implementing computing operations to generate one or more data outputs, such as an output 195, based on one or more data points that are provided for evaluation, such as a group of evaluation data items 197. In some cases, using the optimized IDS 180 improves the configured function of the machine-learning decision system 190 by increasing speed, accuracy, or understandability by which the machine-learning decision system 190 provides the output 195. For example, the machine-learning decision system 190 generates the output 195 with increased accuracy based on one or more class-specific optimized rulesets that are included in (or otherwise indicated by) the optimized IDS 180. Additionally or alternatively, the machine-learning decision system 190 generates the output 195 with increased understandability based on the interpretable rules that are included (or otherwise indicated by) in the class-specific optimized rulesets. A human auditor, for instance, can use the optimized IDS 180 to verify that the machine-learning decision system 190 is generating output 195 based on acceptable criteria.

In some embodiments, an IDS generator creates an optimized IDS based on one or more of class-specific candidate rules or a differential analysis technique. Additionally or alternatively, the IDS generator performs the differential analysis techniques based on one or more data structures created by the IDS generator. For example, the IDS generator creates a data structure including a frequent-pattern tree ("FP tree"). The FP tree includes or otherwise indicates patterns (e.g., combinations of attribute conditions) that are frequently found in a particular dataset, and also includes a support count indicating how often each of the patterns are found in the dataset. Additionally or alternatively, the IDS generator creates a data structure including an augmented FP tree. The augmented FP tree includes or otherwise indicates frequent patterns and the support counts for the frequent patterns, and also includes an itemset count indicating how many subsets in the dataset include the respective frequent patterns. In some cases, the itemset counts, or the support counts, or both are used by the IDS generator to perform the differential analysis technique.

Figure 2:
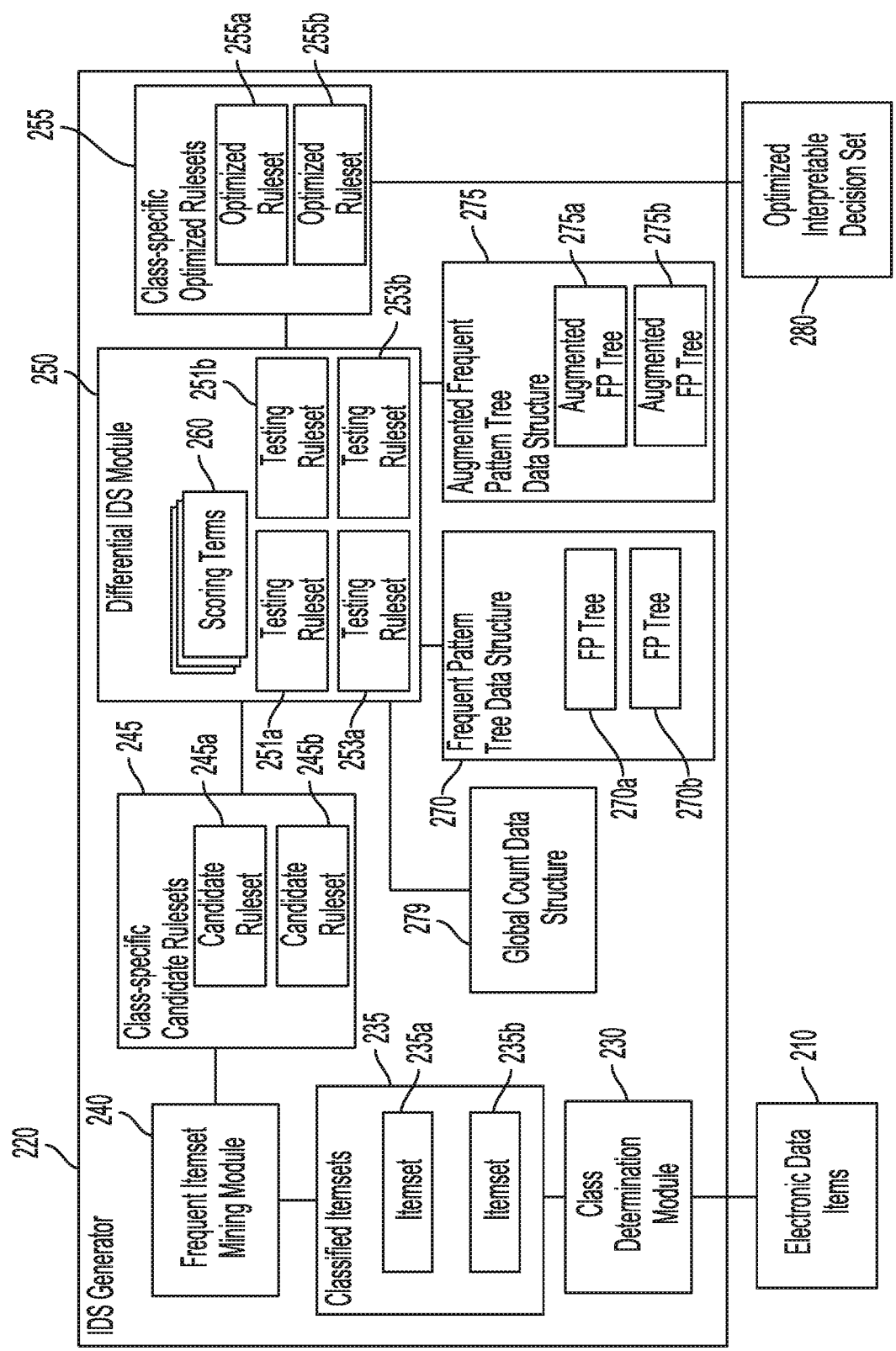
FIG. 2 is a diagram depicting an example of an efficient interpretable decision set generator configured to perform a differential analysis technique based on multiple data structures, according to certain embodiments.

FIG. 2 depicts an example of an IDS generator 220 that is configured to perform a differential analysis technique based on multiple data structures. The IDS generator 220 includes (or otherwise communicates with) a class determination module 230, an FIM module 240, and a differential IDS module 250. Additionally or alternatively, the IDS generator 220 includes or generates one or more FP tree data structures 270 and one or more augmented FP tree data structures 275. In some cases, the IDS generator 220 is configured to receive one or more sets of multi-attribute data items, such as electronic data items 210. Additionally or alternatively, the IDS generator 220 is configured to provide one or more optimized IDS, such as an optimized IDS 280.

In some embodiments, the class determination module 230 determines a class for each data item included in the electronic data items 210. Based on the determined classes for the classified data items, the class determination module 230 generates one or more sets of the classified data items, such as a group of classified itemsets 235. The classified itemsets 235 include, for example, a first classified itemset 235a corresponding to a first determined class, and a second classified itemset 235b corresponding to a second determined class. In some cases, the classes and the associated classified itemsets are determined based on values for a particular group of attributes of the data items, such as a selected group of attributes.

In the IDS generator 220, the FIM module 240 generates one or more class-specific candidate rulesets 245 based on the classified itemsets 235. For example, the FIM module 240 determines, for each class represented by the classified itemsets 235, a respective class-specific candidate ruleset that is associated with the particular data items included in the classified itemset. The class-specific candidate rulesets 245 include, for instance, a first candidate ruleset 245a associated with the classified itemset 235a, and a second candidate ruleset 245b associated with the classified itemset 235b. Additionally or alternatively, each of the class-specific candidate rulesets 245 is generated based on one or more FIM techniques, such as by determining candidate rules for a particular class based on a particular occurrence threshold. In some cases, determining candidate rules for a particular class (e.g., instead of for all data items in the electronic data items 210) improves the class-specific candidate rulesets 245 by increasing relevancy of candidate rules for each of the classes. For example, if the classified itemset 235a does not include enough data items having a particular combination of attributes to meet an occurrence threshold for the first class, the associated candidate ruleset 245a does not include a candidate rule based on the particular combination of attributes. Additionally or alternatively, if the classified itemset 235b includes enough data items having the particular attribute combination to meet an occurrence threshold for the second class, the associated candidate ruleset 245b includes a candidate rule based on the particular combination of attributes. In some cases, improving the relevancy of candidate rules optimizes a class-specific ruleset for a particular class. For example, a differential analysis technique performs with improved speed or accuracy if it does not evaluate irrelevant candidate rules. In some cases, the FIM techniques are applied in parallel to multiple itemsets in the classified itemsets 235. Parallel application of the FIM techniques to the classified itemsets 235 improves, for example, a speed by which the class-specific candidate rulesets 245 are generated.

In FIG. 2, the differential IDS module 250 generates one or more optimized class-specific rulesets 255 based on the class-specific candidate rulesets 245. Additionally or alternatively, the optimized class-specific rulesets 255 are generated based on one or more FP tree data structures 270 and one or more augmented FP tree data structures 275. In some cases, the FP tree data structures 270 and the augmented FP tree data structures 275 are generated for the particular classes. For the first class, for example, the differential IDS module 250 generates at least one FP tree 270a and at least one augmented FP tree 275a, based on the respective class-specific candidate ruleset 245a. The FP tree 270a includes, for each candidate rule in the ruleset 245a, a subtree indicating the combined attribute conditions for the candidate rule and also includes a support count indicating how many data items in the associated classified itemset 235a include the combined conditions. The augmented FP tree 275a includes, for each of the candidate rules for the first class, the subtree and support count for the candidate rule, and also includes an itemset count indicating how many subsets in the associated classified itemset 235a include the combined conditions. For the second class, the FP tree 270b includes subtrees and support counts for each candidate rule in the class-specific ruleset 245b, and the augmented FP tree 275b includes subtrees, support counts, and itemset counts for each candidate rule in the ruleset 245b. In some cases, the support counts, the itemset counts, or both are determined by the FIM module 240 based on the applied FIM techniques during generation of the class-specific candidate rulesets 245. For example, the support counts, the itemset counts, or both are stored in one or more hash maps for a respective data structure, such as a hash map included in the FP tree 270a indicating the support count, or at least one hash map included in the augmented FP tree 275a indicating one or more of the support count or the itemset count.

Additionally or alternatively, the differential IDS module 250 generates a global count data structure 279, indicating a global (e.g., across all classes) support count and a global itemset count. For example, the global count data structure 279 includes a global support count for all candidate rules in all of the class-specific candidate rulesets 245, and a global itemset count for all subsets in all of the classified itemsets 235. In some cases, the support counts, the itemset counts, or both are stored in one or more global hash maps in the global count data structure 279.

In some embodiments, the differential IDS module 250 performs a differential analysis technique, such as a RAPID analysis technique, to evaluate each candidate rule for a particular class. Additionally or alternatively, the differential IDS module 250 evaluates each candidate rule based on a scoring objective function and at least one testing ruleset. For example, each candidate rule is evaluated based on a combination of terms included in the scoring objective function, such as scoring terms 260. At least one term of the scoring terms 260 is an understandability term that evaluates the candidate rule based on an ease by which the candidate rule may be interpreted. Additionally or alternatively, at least one additional term of the scoring terms 260 is an accuracy term that evaluates the candidate rule based on how accurately the candidate rule describes data items in the particular class. For each of the scoring terms 260, the differential IDS module 250 calculates a difference between the first result value of the term based on the testing ruleset combined with the candidate rule and a second result value of the term based on the testing ruleset without the candidate rule. Based on the calculated differences for each of the scoring terms 260, the differential IDS module 250 determines a differential understandability and a differential accuracy for the candidate rule. For example, for each candidate rule in the class-specific ruleset 245a, and for each of the scoring terms 260, the differential IDS module 250 calculates a difference between first and second result values of the term, based on a testing ruleset 251a associated with the first class (e.g., the classified itemset 235a). The difference between the first and second result values is respectively based on the testing ruleset 251a combined with the candidate rule and the testing ruleset 251a without the candidate rule. For each candidate rule in the class-specific ruleset 245b, the differential IDS module 250 calculates a difference between first and second result values of the scoring terms 260, based on another testing ruleset 251b (e.g., associated with the second class) with and without the candidate rule. In some cases, the difference between the first and second result values is based a testing update to the testing ruleset 251a (or to testing ruleset 251b), such as a test update that combines the testing ruleset 251a (or 251b) with the candidate rule or another testing update that removes the candidate rule from the testing ruleset 251a (or 251b).

In some embodiments, the differential IDS module 250 calculates the difference between the pair of result values for a particular scoring term without separately calculating the first and second result values. Additionally or alternatively, the differential IDS module 250 calculates the difference based on a support count or an itemset count included in the FP tree data structures 270 or augmented FP tree data structures 275. For example, a particular scoring term of the scoring terms 260 is based on a change in a quantity or type of data items described by the candidate rule under evaluation. For each candidate rule in the class-specific candidate ruleset 245a, the differential IDS module 250 determines the difference of the change based on the support count or itemset count indicated by the FP tree 270a and the augmented FP tree 275a, without spending time or computing resources to fully calculate the first and second result values for the particular scoring term. In some cases, calculating differences for pairs of result values based on the FP tree data structures 270 and augmented FP tree data structures 275 improves the efficiency of a computing system implementing the differential IDS module 250. For example, one or more of the scoring terms 260 are calculated in a small operation time based on data stored in the data structures 270 or 275, thus reducing a number of computer processing cycles or other computing resources used by the module 250.

In some cases, multiple differences are determined based on multiple testing rulesets that are associated with the particular class for the candidate ruleset being evaluated. For example, as the differential IDS module 250 iterates through each candidate rule in the class-specific candidate ruleset 245a, a first difference is calculated based on the first testing ruleset 251a that includes only candidate rules that have previously been evaluated, and a second difference is calculated based on a second testing ruleset 253a that includes a combination of candidate rules that have previously been evaluated and candidate rules that have not yet been evaluated. The first and second differences are calculated, for example, based on the FP tree 270a and the augmented FP tree 275a, as described above. Additionally or alternatively, for each candidate rule in the class-specific candidate ruleset 245b, a first difference is calculated based on the first testing ruleset 251b and a second difference is calculated based on a second testing ruleset 253b, based on the FP tree 270b and the augmented FP tree 275b.

Based on the calculated difference(s) between the pair of result values for the candidate rule, the differential IDS module 250 determines whether including the candidate rule in a testing ruleset results in a threshold performance impact for the testing ruleset, such as by increasing a combination of the testing ruleset's understandability and accuracy. Additionally or alternatively, the differential IDS module 250 modifies the testing ruleset (or the multiple testing rulesets) based on the calculated difference(s) or the threshold performance impact, or both. For each candidate rule in the class-specific candidate ruleset 245a, for example, the differential IDS module 250 calculates a probability function based on the first and second differences calculated from the first testing ruleset 251a and the second testing ruleset 253a. Additionally or alternatively, the probability function is compared to a threshold probability (e.g., a threshold generated based on a uniform distribution between 0 and 1). Based on a determination that the probability function is greater than or equal to the threshold probability, the differential IDS module 250 modifies the first testing ruleset 251a to include the candidate rule. Based on another determination that the probability function is less than the threshold probability, the differential IDS module 250 modifies the second testing ruleset 253a to omit the candidate rule. In subsequent iterations of the differential analysis technique, an additional candidate rule for the particular class is evaluated based on the modified first (or second) testing ruleset 251a (or 253a). As the differential IDS module 250 evaluates each candidate rule (e.g., iterative evaluation), a subsequent candidate rule is evaluated, for example, based on the modified testing ruleset(s) that were modified during a previous candidate rule's evaluation.

In some cases, the differential IDS module 250 modifies the FP tree data structures 270 and the augmented FP tree data structures 275 based on the evaluations for each candidate rule for each class. For example, for each candidate rule in the class-specific candidate ruleset 245a, based on the determination that the probability function is greater than the threshold probability, the differential IDS module 250 modifies the FP tree 270a to include a subtree that corresponds to the candidate rule being evaluated, and to adjust the support counts corresponding to the candidate rule. Additionally or alternatively, based on the determination that the probability function is less than or equal to the threshold probability, the differential IDS module 250 modifies the augmented FP tree 275a to omit the subtree and to adjust the support counts and the itemset counts corresponding to the candidate rule.

In FIG. 2, the differential IDS module 250 generates the optimized class-specific rulesets 255 based on the testing rulesets for each of the classes. For example, an optimized ruleset 255a associated with the first example class described above is generated based on one or more of the testing rulesets 251a or 253a. The optimized ruleset 255a includes, for example, the evaluated candidate rules that are included in the modified testing ruleset 251a (or 253a). Additionally or alternatively, an optimized ruleset 255b associated with the second example class is generated based on one or more of the testing rulesets 251b or 253b. In some cases, the IDS generator 220 provides the optimized IDS 280 based on a combination of the class-specific optimized rulesets 255. The optimized IDS 280 includes, for instance, the rules included in the optimized rulesets for each of the classes associated with the classified itemsets 235, such as the rules in each of the optimized rulesets 255a and 255b. In some cases, the optimized IDS 280 includes rules that are relevant to one or more of the classes, such as candidate rules evaluated for each class. Additionally or alternatively, the relevancy of the included rules is improved based on the differential understandability and differential accuracy calculated by the differential analysis technique performed by the differential IDS module 250.

Figure 3:
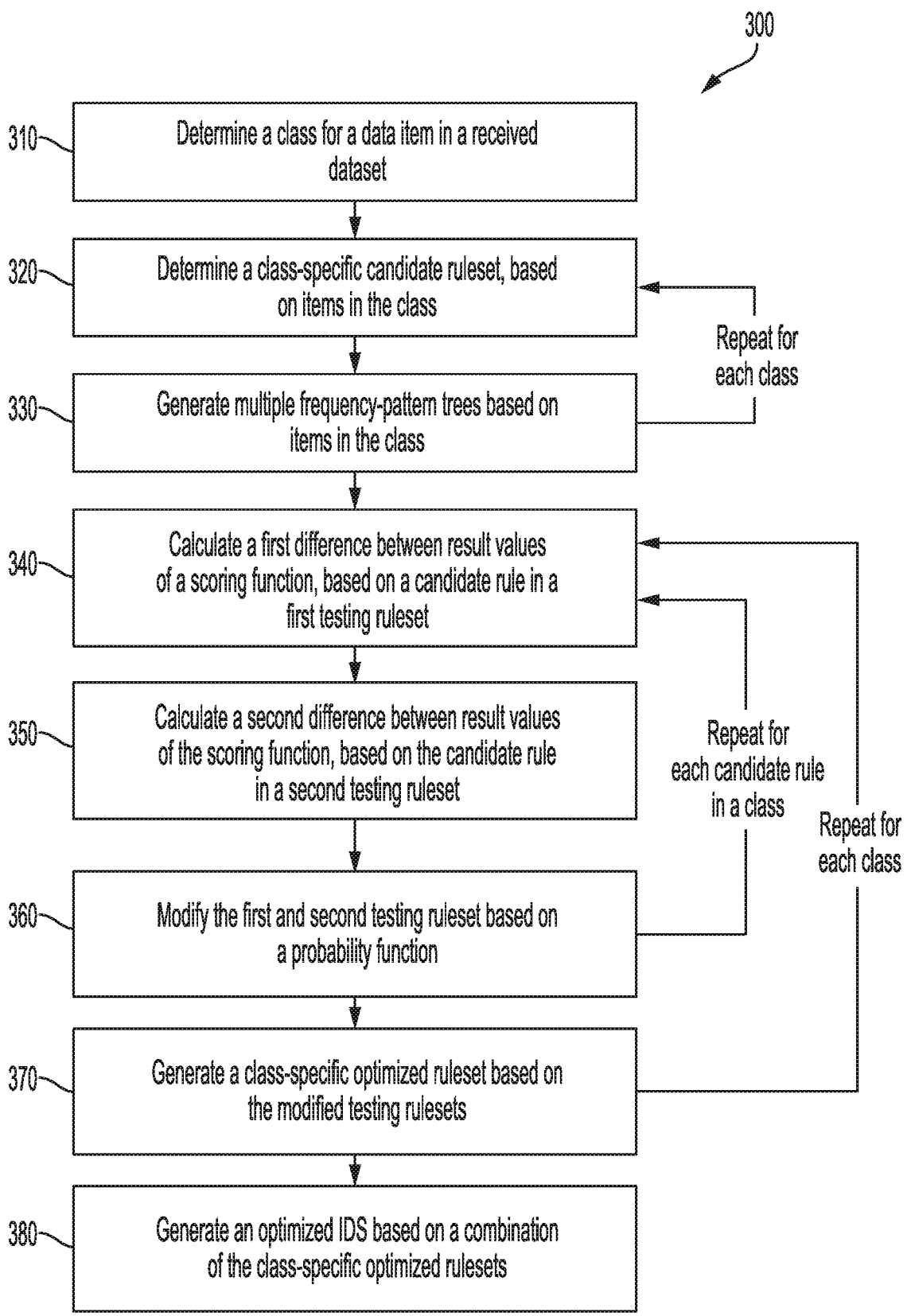
FIG. 3 is a flow chart depicting an example of a process for generating an optimized interpretable decision set, according to certain embodiments.

FIG. 3 is a flow chart depicting an example of a process 300 for generating an optimized IDS. In some embodiments, such as described in regards to FIGS. 1 and 2, a computing device executing an IDS generator implements operations described in FIG. 3, by executing suitable program code. For illustrative purposes, the process 300 is described with reference to the examples depicted in FIGS. 1 and 2. Other implementations, however, are possible.

At block 310, the process 300 involves determining a class for a data item in a received dataset, such as the electronic data items 110. Respective classes for multiple data items in the dataset are determined, for example, based on one or more attribute values of each data item. In some cases, a class determination module, such as the class determination module 130, determines the respective class for each of the data items by determining an attribute condition that is met by one or more of the data items. Each data item in a particular class meets the condition for the particular class. Additionally or alternatively, each data item in the particular class has a particular value for at least one attribute that is included in the class condition.

At block 320, the process 300 involves determining a class-specific candidate ruleset for each class, based on data items included in the respective class. A class-specific candidate ruleset is determined, for example, based on the set of classified data items for each of the classes. In some cases, the class-specific candidate ruleset is determined based on an FIM technique that is applied, such as by the FIM module 140, to the classified itemset for the respective class. Additionally or alternatively, each candidate rule in the class-specific candidate ruleset indicates an additional attribute condition for data items in the class.

At block 330, the process 300 involves generating multiple FP tree data structures based on data items included in the respective class. The multiple FP tree data structures, such as the data structures 270 and 275, include at least one FP tree and at least one augmented FP tree for each respective class. In some cases, the FP trees for the class are based on the support counts provided by the FIM techniques applied to the respective classified dataset. Additionally or alternatively, the augmented FP trees for the class are based on the support counts and the itemset counts provided by the FIM techniques applied to the respective classified dataset.

In some embodiments, operations related to one or more of blocks 320 or 330 are repeated for each class. For example, the FIM module 140 applies FIM techniques to each itemset in the classified itemsets 135. The FIM techniques are applied to the classified itemsets 135 iteratively, or in parallel, or a combination of iteratively and in parallel. Based on the applied FIM techniques, the FIM module 140 generates the class-specific candidate rulesets 145, each class-specific candidate ruleset corresponding to a respective classified itemset. Additionally or alternatively, the FIM module 140 generates the FP trees, including augmented FP trees, corresponding to the respective classified itemset.

In some cases, the process 300 involves evaluating a class-specific candidate ruleset based on at least one comparison of a testing ruleset with each particular candidate rule in the set and the testing ruleset without the particular candidate rule. At block 340, the process 300 involves calculating a first difference between multiple result values in an objective function that includes at least one term for scoring a ruleset. In some cases, the first difference is calculated based on a candidate rule in a class-specific candidate ruleset, such that a first pair of result values are based on a first testing ruleset with the candidate rule and the first testing ruleset without the candidate rule. At block 350, the process 300 involves calculating a second difference between multiple result values in the scoring objective function. In some cases, the second difference is calculated based on the candidate rule, such that a second pair of result values are based on a second testing ruleset with the candidate rule and the second testing ruleset without the candidate rule.

In some embodiments, one or more of the first and second differences are determined based on data stored in the FP tree and the augmented FP tree. For example, for at least one term in the scoring objective function, the difference between the multiple result values is based on a support count stored in the FP tree and an itemset count stored in the augmented FP tree.

At block 360, the process 300 involves modifying at least one testing ruleset based on a probability function computed from the first difference and the second difference. For example, a differential IDS module, such as the differential IDS module 150, determines one or both of a probability function that is based on the first and second differences, and a threshold probability. Based on a comparison of the probability function and the threshold probability, the differential IDS module modifies one or more of the first testing ruleset or the second testing ruleset. For example, responsive to determining that the probability function is greater than or equal to the threshold probability, the differential IDS module modifies the first testing ruleset to include the candidate rule. Additionally or alternatively, responsive to determining that the probability function is less than the threshold probability, the differential IDS module modifies the second testing ruleset to omit the candidate rule.

In some embodiments, operations related to one or more of blocks 340, 350, or 360 are repeated for each candidate rule in a class. For example, the differential IDS module 150 iteratively calculates first and second differences for each candidate rule in a particular one of the class-specific candidate rulesets 145. Additionally or alternatively, for each term in the scoring objective function, the differences are calculated iteratively, in parallel, or a combination of iteratively and in parallel.

At block 370, the process 300 involves generating a class-specific optimized ruleset based on one or more of the modified first testing ruleset or the modified second testing ruleset. In some cases, the differential IDS module generates the class-specific optimized ruleset based on the group of candidate rules included in the first testing ruleset (such as candidate rules added during modification of the first testing ruleset). Additionally or alternatively, the class-specific optimized ruleset is generated based on the group of candidate rules included in the modified second testing ruleset (such as candidate rules that were not omitted during modification of the second testing ruleset).

In some embodiments, operations related to one or more of blocks 340, 350, 360, or 370 are repeated for each class. For example, the differential IDS module 150 generates, iteratively or in parallel, a class-specific optimized ruleset for each class indicated by the class-specific candidate rulesets 145. Additionally or alternatively, the optimized ruleset for each respective class is based on an iterative calculation of first and second differences for each candidate rule in a particular one of the class-specific candidate rulesets 145 that corresponds to the respective class.

At block 380, the process 300 involves generating an optimized IDS based on a combination of the class-specific optimized rulesets. For example, an IDS generator, such as the IDS generator 120, creates an optimized IDS, such as the optimized IDS 180, based on a combination of the rules included in the class-specific optimized rulesets. In some embodiments, the optimized IDS is provided to an additional computing system, such as the machine-learning decision system 190, for use in additional applications, such as data science applications.

Figure 4:
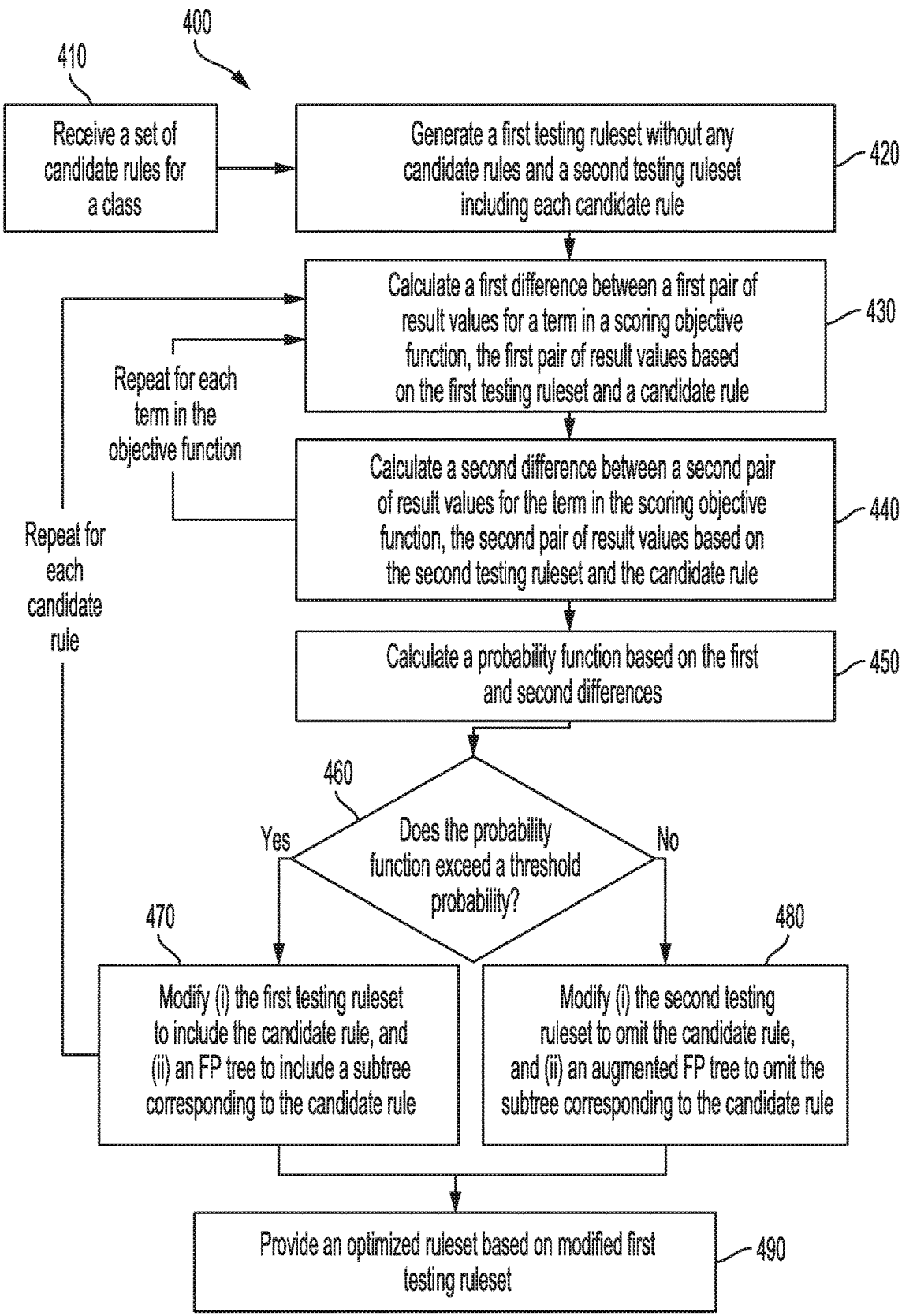
FIG. 4 is a flow chart depicting an example of a process for performing a differential analysis technique, according to certain embodiments.

FIG. 4 is a flowchart depicting an example of a process 400 for performing a differential analysis technique. The differential analysis technique includes, for example, a RAPID analysis technique. In some embodiments, such as described in regards to FIGS. 1-3, a computing device executing a differential IDS module implements operations described in FIG. 4, by executing suitable program code. For illustrative purposes, the process 400 is described with reference to the examples depicted in FIGS. 1-3. Other implementations, however, are possible.

At block 410, the process 400 involves receiving a set of candidate rules for a particular class. For example, the differential IDS module 250 receives the class-specific candidate ruleset 245a associated with the first example class (e.g., for the classified itemset 235a). In some cases, the candidate ruleset includes multiple candidate rules describing attribute conditions for data items included in the respective class.

At block 420, the process 400 involves generating, for the candidate ruleset, a first testing ruleset and a second testing ruleset. The generated first testing ruleset omits each of the candidate rules of the candidate ruleset. Additionally or alternatively, the generated second testing ruleset includes each of the candidate rules of the candidate ruleset. For example, the differential IDS module 250 generates, for the candidate ruleset 245a, the first testing ruleset 251a and the second testing ruleset 253a. Upon generation, the first testing ruleset 251a does not include any candidate rules from the ruleset 245a, and the second testing ruleset 253a includes all candidate rules from the ruleset 245a.

At block 430, the process 400 involves calculating a first difference between a first pair of result values for a particular term in a scoring objective function. In some cases, the first pair of result values is based on the first testing ruleset and a particular candidate rule from the candidate ruleset. Additionally or alternatively, the first difference is calculated based on a first result value for the particular scoring term based on the first testing ruleset combined with the candidate rule and a second result value based on the first testing ruleset without the candidate rule. For example, the differential IDS module 250 calculates a first difference for one of the scoring terms 260 based on the first testing ruleset 251a combined with a particular one of the candidate rules from the ruleset 245a and on the first testing ruleset 251a omitting the particular candidate rule.

At block 440, the process 400 involves calculating a second difference between a second pair of result values for the particular term in the scoring objective function. In some cases, the second pair of result values is based on the second testing ruleset and the particular candidate rule, such as result values based on the second testing ruleset combined with the candidate rule and the second testing ruleset without the candidate rule. For example, the differential IDS module 250 calculates a second difference or the one of the scoring terms 260 based on the second testing ruleset 253a combined with the particular candidate rule and on the second testing ruleset 253a omitting the particular candidate rule.

In some embodiments, operations related one or more of blocks 430 or 440 are performed based on one or more additional data structures. For example, the first and second differences between the first and second pairs of result values are calculated based on an FP tree or an augmented FP tree. In some cases, the first and second differences are calculated without separately calculating the first and second result values. For example, a difference between a scoring term based on a testing ruleset with a candidate rule and the scoring term based on the testing ruleset without the candidate rule is determined based on a support count or an itemset count indicated by an FP tree data structure or and augmented FP tree data structure.

In some embodiments, operations related to one or more of blocks 430 or 440 are repeated for each scoring term in the scoring objective function, such as each of the scoring terms 260. For example, a scoring objective function includes at least one understandability term and at least one accuracy term. During evaluation of a particular candidate rule, a first and second difference between first and second pairs of result values are calculated for each scoring term in the scoring objective function.

At block 450, the process 400 involves calculating a probability function based on the first difference and the second difference for the particular candidate rule. In some cases, the probability function is based on respective first and second differences for each of the scoring terms in the scoring objective function, such as by summing the first respective differences and summing the second respective differences. For example, the differential IDS module 250 calculates a probability function for the particular candidate rule being evaluated from the candidate ruleset 245a, based on a sum of the differences for the scoring terms 260.

At block 460, the process 400 involves comparing the probability function for the particular candidate rule to a threshold probability. In some cases, the threshold probability is associated with the particular class of the candidate ruleset. For example, the differential IDS module 250 compares a probability function for an example candidate rule in the candidate ruleset 245a to a threshold probability associated with the class for the classified itemset 235a. In some cases, the threshold probability for the candidate ruleset being evaluated by the differential analysis technique is determined based on a uniform distribution, such as a uniform distribution included in unconstrained submodular maximization that is included in the differential analysis technique.

If operations related to block 460 determine that the probability function exceeds or is equal to the threshold probability, process 400 proceeds to another block, such as block 470. If operations related to block 460 determine that the probability function is less than the threshold probability, process 400 proceeds to another block, such as block 480.

At block 470, the process 400 involves modifying the first testing ruleset and an FP tree data structure. In some cases, the first testing ruleset is modified to include the particular candidate rule. Additionally or alternatively, the FP tree data structure is modified to include a subtree corresponding to the candidate rule and to adjust one or more support counts corresponding to the candidate rule. For example, the differential IDS module 250 modifies the FP tree 270a responsive to determining that the threshold probability for the example candidate rule from the ruleset 245a is greater than the threshold probability.

At block 480, the process 400 involves modifying the second testing ruleset and an augmented FP tree data structure. In some cases, the second testing ruleset is modified to omit the particular candidate rule. Additionally or alternatively, the augmented FP tree data structure is modified to omit a subtree corresponding to the candidate rule and to adjust one or more support counts and itemset counts corresponding to the candidate rule. For example, the differential IDS module 250 modifies the augmented FP tree 275a responsive to determining that the threshold probability for the example candidate rule from the ruleset 245a is less than the threshold probability.

In some embodiments, operations related to one or more of blocks 430, 440, 450, 460, 470, or 480 are repeated for each candidate rule in the class-specific candidate ruleset, such as each candidate rule in the candidate ruleset 245a. Additionally or alternatively, one or more testing rulesets associated with the class-specific candidate ruleset are modified based on the evaluation of each candidate rule in the class-specific candidate ruleset. For example, the testing ruleset 251a is generated as an empty set, e.g., by omitting all candidate rules from the candidate ruleset 245a. Additionally or alternatively, the testing ruleset 253a is generated to include all candidate rules from the candidate ruleset 245a. As each candidate rule from the ruleset 245a is evaluated, such as based on a differential analysis technique, candidate rules that improve the overall understandability and accuracy of the candidate ruleset (e.g., such as based on evaluation of the scoring objective function) are added to the testing ruleset 251a. Additionally or alternatively, candidate rules that decrease the overall understandability and accuracy of the candidate ruleset are removed (or otherwise omitted) from the testing ruleset 253a. Responsive to evaluating all candidate rules in the class-specific candidate ruleset, such as iteration of the differential IDS module 250 through the candidate ruleset 245a, the testing rulesets (e.g., testing rulesets 251a and 253a) include evaluated rules that improve the overall understandability and accuracy of the ruleset and omit evaluated rules that decrease understandability and accuracy.

At block 490, the process 400 involves providing an class-specific optimized ruleset based on one or more of the modified first testing ruleset or the modified second testing ruleset. For example, the differential IDS module 250 generates the optimized ruleset 255a based on one or more of the testing rulesets 251a and 253. In some embodiments, operations related to process 400 are repeated for each class, such as by iterating through multiple class-specific candidate rulesets for multiple respective classes associated with a group of classified itemsets. For example, the differential IDS module 250 generates a respective one of the class-specific optimized rulesets 255 for each of the classes associated with the classified itemsets 235.

Example Scoring Terms of a Scoring Objective Function

In some embodiments, a differential analysis technique (such as a RAPID analysis technique) uses a scoring objective function to evaluate candidate rules in a class-specific candidate ruleset. The scoring objective function includes, for example, one or more terms (such as the scoring terms 260) by which an understandability and an accuracy of a candidate rule is evaluated. In some cases, the scoring objective function includes at least one scoring term is an understandability term that evaluates the candidate rule based on an ease by which the candidate rule may be interpreted. Additionally or alternatively, the scoring objective function includes at least one accuracy term that evaluates the candidate rule based on how accurately the candidate rule describes data items in the respective class of the candidate rule. A candidate rule is evaluated to have a relatively higher understandability based on one or more understandability terms having a relatively high value (or summed values, in the case of multiple understandability terms). The candidate rule is also evaluated to have a relatively higher accuracy based on one or more accuracy terms having a relatively high value (or summed values, in the case of multiple accuracy terms). A class-specific optimized ruleset is determined based on a group of candidate rules that maximize the value of the scoring objective function, such as by maximizing the values of one or more understandability or accuracy terms.

In an example scoring objective function, the understandability is increased by selecting specific candidate rules such that the size of the optimized ruleset is small, the selected rules each have a small length, and the overlap between candidate rules is reduced (e.g., a minimum number of candidate rules that apply to overlapping groups of data items in the class). The accuracy is increased by selecting specific candidate rules such that the size of the false positive rate is decreased (e.g., a minimum number of candidate rules that do not incorrectly classify data items) and the true positive rate is increased (e.g., a maximum number of candidate rules that correctly classify data items).

Several example variables and phrases for the example scoring objective function are defined. For a particular class "C", set "D" is the set of data items included in the particular class (e.g., described by a class-specific itemset). Label "c" is a class label belonging to the particular class C. Number "N" is the total number of data items in the set D. Attributes "M" is the total number of attributes associated with a particular data item. Set "R" is the set of class-specific candidate rules from the overall ruleset "S" (e.g., $R \subseteq S$, class-specific candidate rules R belonging to overall ruleset S describing all classes). Size "k" is the total size of the overall ruleset S. "Size(R)" is the total size of the class-specific candidate ruleset R. Rule "r" is a single candidate rule from the set R. "Length(r)" is the length of the rule r, such as the number of attributes specified in the rule r. "Overlap($r_i$, $r_j$)" is the set of data items covered (e.g., classified) by both the rules $r_i$ and $r_j$. "Incorrect-cover(r)" is the set of data items incorrectly covered by r (e.g., incorrectly classified by r). "Correct-cover(r)" is the set of data items correctly classified by the rule r (e.g., correctly classified by rule r). "$L_{max}$" is the maximum rule length across all rules $r \in S$ (e.g., all rules r belonging to the overall ruleset S). "Cover$_D$(r)" is the set of the data items in the set D which satisfy the attributes used in the rule r. For example, if the rule r is expressed as {age=45, profession=teacher}, then cover$_D$(r) will contain all the data items which have the variable "age" as "45" and the variable "profession" as "teacher," irrespective of the values of the other attributes for the data items. "Support$_D$(r)" is the support (e.g., the quantity of data items classified by the rule) of the rule r in the set D. The function "$r_i \cup r_j$" is the union of the attributes of rules $r_i$ and $r_j$. For example, union of the two attribute sets {age=45, profession=teacher} and {age=45, postal code=12345} will be {age=45, profession=teacher, postal code=12345}.

In some embodiments, the particular scoring terms for the example scoring objective function are defined as follows.

To improve understandability, a small number of rules is desired. An understandability term is defined as $f_1(R)=k-size(R)$. The understandability term $f_1$ is maximized by class-specific candidate ruleset R having a small size relative to the size k of the overall ruleset S.

To improve understandability, each rule in the subset should be of a small length. Another understandability term is defined as $f_2(R)=L_{max} \cdot k - \Sigma_{r \in R} \text{length}(r)$. The understandability term $f_2$ is maximized by the summed length of rules r in the class-specific candidate ruleset R having a short length relative to the maximum rule length $L_{max}$ multiplied by the size k of the overall ruleset S.

To improve understandability, overlap between any pair of rules in the class-specific candidate ruleset R should be small. Another understandability term is defined as $f_3(R) = N \cdot k^2 - \Sigma_{r_i, r_j \in R; \ i \leq j; \ c_i = c_j} \text{overlap}(r_i, r_j)$. The understandability term $f_3$ is maximized by the summed overlap between rules r with identical class labels c having a small size relative to the N data items multiplied by the squared size k. Another understandability term is defined as $f_4(R) = N \cdot k^2 - \Sigma_{r_i, r_j \in R; \ i \leq j; \ c_i \neq c_j} \text{overlap}(r_i, r_j)$. The understandability term $f_4$ is maximized by the summed overlap between rules r with different class labels c having a small size relative to the N data items multiplied by the squared size k.

To improve understandability, each class represented by a set of electronic data items should be represented by at least one rule. Another understandability term is defined as $f_5 = \Sigma_{c' \in C} \mathbb{1} \ (\exists r = (s, c) \in \mathcal{R} \ \text{such that} \ c = c')$. The understandability term $f_5$ is maximized by summing the indications over each class label c belonging to the particular class C, where the indications are equal to 1 if there exists at least one rule r belonging to the class-specific candidate ruleset R describing the particular class C, and where the indications are equal to 0 if there is no rule r that describes the particular class C.

To improve accuracy, the number of incorrect points that each rule covers (e.g., incorrectly classified by r) should be minimized. An accuracy term is defined as $f_6(R) = N \cdot k - \Sigma_{r \in R} |\text{incorrect-cover}(r)|$. The accuracy term $f_6$ is maximized by the summed incorrect cover of rules r belonging to the class-specific candidate ruleset R having a small size relative to the N data items multiplied by the size k.

To improve accuracy, the number of correct points that each rule covers (e.g., correctly classified by r) should be maximized. Another accuracy term is defined as $f_7(\mathcal{R}) = \Sigma_{(x,y) \in \mathcal{D}} \mathbb{1} \ (|\{r| (x, y) \in \text{correct-cover}_\mathcal{D} (r)\}| \geq 1)$. The accuracy term $f_7$ is maximized by summing the indications over each data item (x, y) belonging to the class-specific item set D, where the indications are equal to 1 if there exists at least one rule r describing the data item (x, y) belonging to the set of data items correctly classified by the rule r, and where the indications are equal to 0 if there is no rule r describing the data item (x, y) that is correctly classified by the rule r.

In some embodiments, the example scoring objective function is based on a combination of the scoring terms. For the class-specific candidate ruleset R, for example, the example scoring objective function is defined as $f((\lambda_1, \lambda_2, \ldots, \lambda_7), \mathcal{R}) = \Sigma_{i=1}^{7} \lambda_i f_i(\mathcal{R})$, where $f(\mathcal{R})$ is equal to the sum of the scoring terms $f_i$, each scoring term $f_i$ weighted by a respective non-negative weight $\lambda_i$. In some cases, a class-specific optimized ruleset is selected from candidate rules evaluated based on the example scoring objective function, such that the class-specific optimized ruleset is given by $$\underset{\mathcal{R} \subseteq S \times C}{\arg\max} \ f((\lambda_1, \lambda_2, \cdots, \lambda_7), \mathcal{R}),$$

where the optimized ruleset includes a subset of the rules r that maximizes the value of $f(\mathcal{R})$.

Example Differential Scoring Terms of a Scoring Objective Function

In some embodiments, a differential analysis technique (such as a RAPID analysis technique) evaluates candidate rules in a class-specific candidate ruleset based on one or more scoring terms in a scoring objective function, such as the understandability terms or accuracy terms described above for the example scoring objective function. In some cases, evaluation of the candidate rules is made more efficient (e.g., reducing processing time, reducing computing resources) by calculating differential scoring terms, such as a differential understandability term or a differential accuracy term. A differential scoring term is calculated based on a difference between the scoring term based on a testing ruleset with a candidate rule and the testing ruleset without the candidate rule. In some cases, the difference for the scoring term is more efficiently calculated as compared to calculating the scoring term itself. For example, an operation time is improved by determining a differential scoring term based on data stored in an additional data structure, reducing a number of computer processing cycles used to determine the differential scoring term. Examples of respective operation times for scoring terms and corresponding differential scoring terms are described below.

In some embodiments, such as for the example scoring objective function described above, a particular differential scoring term $\Delta f_i$ for a particular scoring term $f_i$ is calculated as follows. In some cases, an operation time $\Theta(\cdot)$ indicates a quantity of computing operations to perform a calculation. For example, a scoring term $f_i$ with an operation time $\Theta(50)$ is calculated in 50 computing operations (e.g., 50 processing cycles of a microprocessor).

The understandability term $f_1(R) = k - \text{size}(R)$ computes a difference between the size k of the overall ruleset S and the size of the class-specific candidate ruleset R. The understandability term $f_1$ is based on a subtraction operation, and has an operation time $\Theta(1)$. A differential understandability term $\Delta f_1$ is based on the length of the current candidate rule being evaluated (e.g., length(r)), and has an operation time $\Theta(1)$. In some cases, the differential understandability term $\Delta f_1$ has an equivalent operation time compared to the understandability term $f_1$.

The understandability term $f_2(R) = L_{max} \cdot k - \Sigma_{r \in R} \text{length}(r)$ computes a difference between the maximum rule length $L_{max}$ multiplied by the size k of the overall ruleset S and the summed length of rules r in the class-specific candidate ruleset R. The understandability term $f_2$ iterates over the size k to find the rule length $L_{max}$, and has an operation time $\Theta(k)$. A differential understandability term $\Delta f_2$ is based on the length of the current candidate rule being evaluated (e.g., length(r)), and has an operation time $\Theta(1)$. In some cases, the differential understandability term $\Delta f_2$ has an improved operation time compared to the understandability term $f_2$.

The understandability term $f_3(R) = N \cdot k^2 - \Sigma_{r_i, r_j \in R; \ i \leq j; \ c_i = c_j} \text{overlap}(r_i, r_j)$ computes an overlap between the rules $r_i$ and $r_j$ with identical class labels c. The understandability term $f_4(R) = N \cdot k^2 - \Sigma_{r_i, r_j \in R; \ i \leq j; \ c_i \neq c_j} \text{overlap}(r_i, r_j)$ computes an overlap between the rules $r_i$ and $r_j$ with different class labels c. The understandability term $f_3$ and the understandability term $f_4$ each iterates over pairs of rules included in the candidate ruleset R, and have a combined operation time $\Theta(|\mathcal{R}|^2 \cdot N \cdot (M + \log N))$. A differential understandability term $\Delta f_3$ is based on determining an overlap of the current candidate rule with all other candidate rules in the same class (e.g., $c_i = c_j$). Another differential understandability term $\Delta f_4$ is based on determining an overlap of the current candidate rule with all other candidate rules in different classes (e.g., $c_i \neq c_j$). The differential understandability terms $\Delta f_3$ and $\Delta f_4$ have a combined operation time $\Theta(k)$. In some cases, the differential understandability terms $\Delta f_3$ and $\Delta f_4$ have an improved combined operation time compared to the understandability terms $f_3$ and $f_4$.

The understandability term $f_5 = \Sigma_{c \in C} \mathbb{1} (\exists r = (s, c) \in \mathcal{R}$ such that $c = c')$ iterates over the class-specific candidate ruleset R to find covered classes, and has an operation time $\Theta(\text{size}(R))$. A differential understandability term $\Delta f_5$ is based on, for example, determining whether the rule r covers a previously uncovered class, such as for the first testing ruleset 251a that includes only candidate rules that have previously been evaluated. Additionally or alternatively, the differential understandability term $\Delta f_5$ is based on determining whether the rule r is the only rule covering a class, such as for the second testing ruleset 253a that includes a combination of candidate rules that have previously been evaluated and candidate rules that have not yet been evaluated. In the described cases (e.g., for the first testing ruleset 251a, for the second testing ruleset 253a), the differential understandability term $\Delta f_5$ has an operation time $\Theta(1)$. In some cases, the differential understandability term $\Delta f_5$ has an improved operation time compared to the understandability term $f_5$.

The accuracy term $f_6(R) = N \cdot k - \Sigma_{r \in R} |\text{incorrect-cover}(r)|$ iterates over the class-specific candidate ruleset R to determine a size of the incorrect cover of rule r, and has an operation time $\Theta(\text{size}(R) \cdot N \cdot M)$. A differential accuracy term $\Delta f_6$ is based on a difference between a global cover of rule r (e.g., based on a global itemset count indicated by the global count data structure 279) and a cover of rule r for the class-specific data items (e.g., based on an itemset count indicated by the augmented FP tree data structure 275a). In such cases, the differential accuracy term $\Delta f_6$ has an operation time $\Theta(1)$, based on the itemset counts stored in data structures (e.g., data structures 279, 275a). In some cases, the differential accuracy term $\Delta f_6$ has an improved operation time compared to the accuracy term $f_6$.

The accuracy term $f_7(\mathcal{R}) = \Sigma_{(x,y) \in \mathcal{D}} \mathbb{1} (|\{r|(x, y) \in \text{correct-cover}_\mathcal{D}(r)\}| \geq 1)$ iterates over the class-specific candidate ruleset R to determine a size of the correct cover of rule r, and has an operation time $\Theta(\text{size}(R) \cdot N \cdot (M + \log N))$. A differential accuracy term $\Delta f_7$ is based on a difference in the correct cover of a testing ruleset. In some embodiments, the differential accuracy term $\Delta f_7$ is based on one or more FP trees, such as the FP tree 270a and the augmented FP tree 275a. For the first testing ruleset 251a, the differential accuracy term $\Delta f_7$ is calculated based on a first quantity of data items correctly covered by rule r that were not previously covered by any other rule in the ruleset 251a, based on adding (or simulating adding) the rule r to the ruleset 251a. The first quantity of covered data items is determined based on the support count indicated by the FP tree 270a, such as by adding (or simulating adding) a subtree for rule r to the FP tree 270a. For the second testing ruleset 253a, the differential accuracy term $\Delta f_7$ is calculated based on a second quantity of data items covered by rule r that are not covered by any other rule in the ruleset 253a, based on deleting (or simulating deleting) the rule r from the ruleset 253a. The second quantity of covered data items is determined based on the support count indicated by the augmented FP tree 275a, such as by deleting (or simulating deleting adding) a subtree for rule r from the augmented FP tree 275a. In such cases, the differential accuracy term $\Delta f_7$ has an operation time $\Theta(M)$, based on a depth of the trees included in the FP trees (e.g., FP tree 270a, augmented FP tree 275a). In some cases, the differential accuracy term $\Delta f_7$ has an improved operation time compared to the accuracy term $f_7$.

In some embodiments, evaluating differential scoring terms improves efficiency of calculating a scoring objective function. For the class-specific candidate ruleset R, for example, the operation time of the example scoring objective function is a sum of the operation times of the scoring terms $f_i$, and the example scoring function has an operation time $\Theta((\text{size}(R))^2 \cdot N \cdot (M + \log N))$. Based on a differential analysis technique, the operation time is a sum of the operation times of the differential scoring terms $\Delta f_i$. For at least the differential scoring terms $\Delta f_6$ and $\Delta f_7$, operation time is improved by evaluating $\Delta f_6$ and $\Delta f_7$ based on data stored in the FP tree and augmented FP tree. Additionally or alternatively, for at least the differential scoring terms $\Delta f_2$, $\Delta f_3$, and $\Delta f_4$, operation time is improved by evaluating $\Delta f_2$, $\Delta f_3$, and $\Delta f_4$ based on a length of a rule or an overlap between rules. Given the improved operation times for at least the differential scoring terms $\Delta f_2$, $\Delta f_3$, $\Delta f_4$, $\Delta f_6$, and $\Delta f_7$, the differential analysis of the example scoring function has an improved operation time $\Theta(k+M)$. In some cases, the differential analysis of the example scoring function has an improved operation time compared to a conventional analysis of the example scoring function. Experimental comparison of a differential analysis technique (such as RAPID analysis) to a conventional analysis technique (such as conventional IDS analysis) indicates that, on a given example computing system (e.g., 61 GB of memory, processor frequency of 2.3 GHz), the differential analysis technique is performed in a time of approximately 0.100 seconds, as compared to the conventional analysis technique performed in a time of approximately 525 seconds.

Example Computing System

Figure 5:
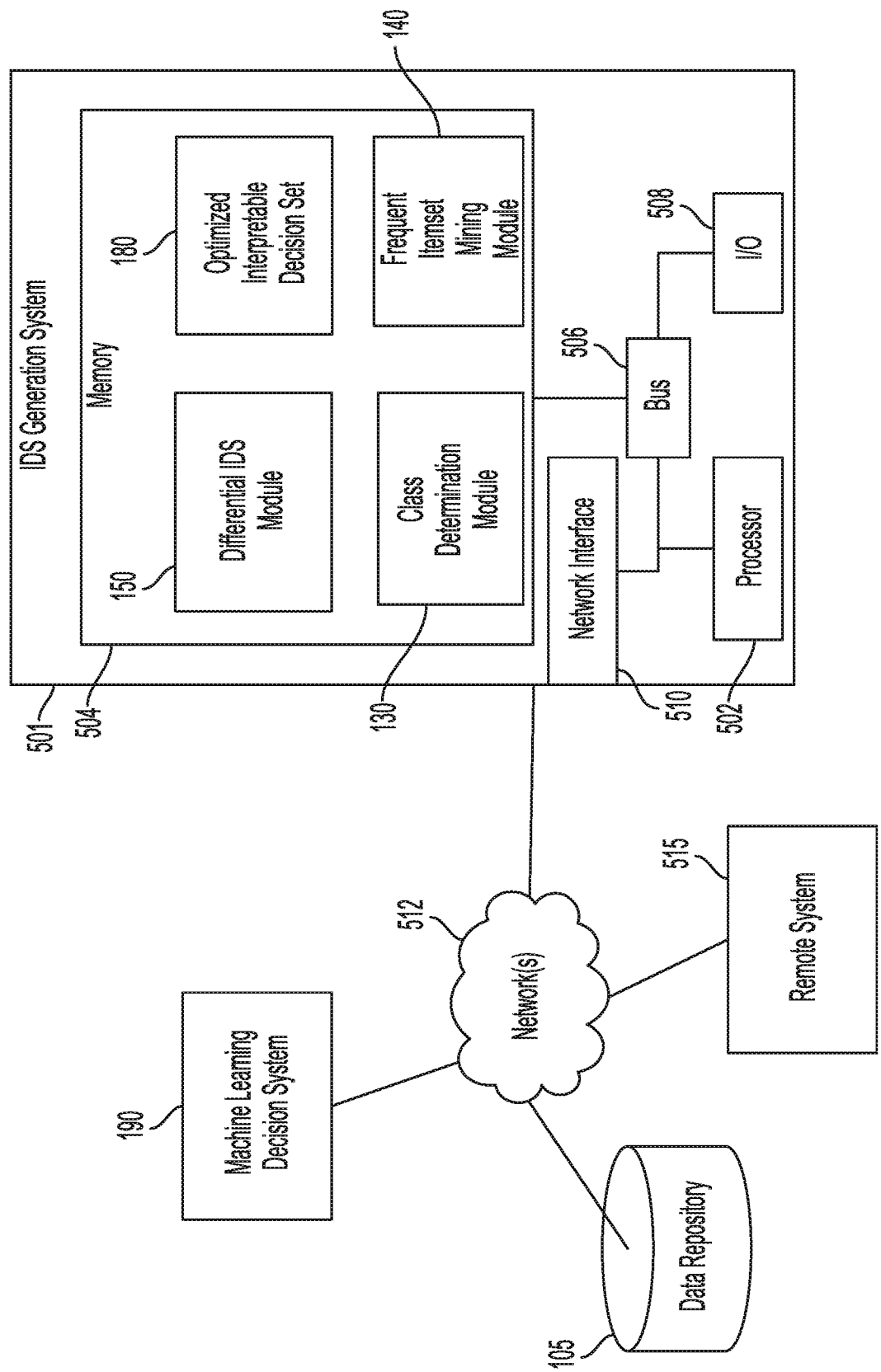
FIG. 5 is a block diagram depicting an example of a computing system for implementing an efficient interpretable decision set generator, according to certain embodiments.

Any suitable computing system or group of computing systems can be used for performing the operations described herein. For example, FIG. 5 is a block diagram depicting a computing system that is configured to implement an IDS generator (such as IDS generator 120), according to certain embodiments.

The depicted example of an IDS generation system 501 includes one or more processors 502 communicatively coupled to one or more memory devices 504. The processor 502 executes computer-executable program code or accesses information stored in the memory device 504. Examples of processor 502 include a microprocessor, an application-specific integrated circuit ("ASIC"), a field-programmable gate array ("FPGA"), or other suitable processing device. The processor 502 can include any number of processing devices, including one.

The memory device 504 includes any suitable non-transitory computer-readable medium for storing the differential IDS module 150, the class determination module 130, the FIM module 140, the optimized IDS 180, and other received or determined values or data objects. The computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

The IDS generation system 501 may also include a number of external or internal devices such as input or output devices. For example, the IDS generation system 501 is shown with an input/output ("I/O") interface 508 that can receive input from input devices or provide output to output devices. A bus 506 can also be included in the IDS generation system 501. The bus 506 can communicatively couple one or more components of the IDS generation system 501.

The IDS generation system 501 executes program code that configures the processor 502 to perform one or more of the operations described above with respect to FIGS. 1-4. The program code includes operations related to, for example, one or more of the differential IDS module 150, the class determination module 130, the FIM module 140, the optimized IDS 180, or other suitable applications or memory structures that perform one or more operations described herein. The program code may be resident in the memory device 504 or any suitable computer-readable medium and may be executed by the processor 502 or any other suitable processor. In some embodiments, the program code described above, the differential IDS module 150, the class determination module 130, the FIM module 140, and the optimized IDS 180 are stored in the memory device 504, as depicted in FIG. 5. In additional or alternative embodiments, one or more of the differential IDS module 150, the class determination module 130, the FIM module 140, the optimized IDS 180, and the program code described above are stored in one or more memory devices accessible via a data network, such as a memory device accessible via a cloud service.

The IDS generation system 501 depicted in FIG. 5 also includes at least one network interface 510. The network interface 510 includes any device or group of devices suitable for establishing a wired or wireless data connection to one or more data networks 512. Non-limiting examples of the network interface 510 include an Ethernet network adapter, a modem, a wireless network antenna, and/or the like. A remote system 515 is connected to the IDS generation system 501 via network 512, and remote system 515 can perform some of the operations described herein, such as storing or classifying electronic data items, determining class-specific candidate rulesets, or other operations. The IDS generation system 501 is able to communicate with one or more of the remote computing system 515, the data repository 105, or the machine-learning decision system 190 using the network interface 510. Although FIG. 5 depicts the data repository 105, or the machine-learning decision system 190 as connected to IDS generation system 501 via the networks 512, other embodiments are possible, including the machine-learning decision system 190 running as a program in the memory 504 of the IDS generation system 501, or the data repository 105 residing in the memory 504 or in an additional storage structure of the IDS generation system 501.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

What is claimed is:

1. A method for generating an interpretable decision set ("IDS") from multiple classes of electronic data items, the method comprising:
determining, by an IDS generator, class-specific candidate rulesets for the multiple classes of the electronic data items, respectively;
generating, by the IDS generator, an optimized IDS that includes a combination of class-specific optimized rulesets, wherein generating each class-specific optimized ruleset for a particular class of the multiple classes comprises:
generating, for the particular class, a frequent pattern tree having a support count for a candidate rule, the support count indicating a quantity of items associated with the candidate rule;
generating, for the particular class, an augmented frequent pattern tree having the support count and an itemset count for the candidate rule, the itemset count indicating a number of item sets that meet at least a respective condition indicated by the candidate rule, calculating (i) a first difference between result values computed from a first testing ruleset associated with a class-specific candidate ruleset for the particular class, and (ii) calculating a second difference between result values computed from a second testing ruleset associated with the class-specific candidate ruleset for the particular class, wherein each of the first and second differences is determined from respective testing updates of the first and second testing rulesets based on an inclusion of the candidate rule, wherein, for a first scoring term of a scoring objective function, the first difference is calculated based on the support count indicated by the frequent pattern tree and the second difference is calculated based on the support count indicated by the augmented frequent pattern tree, modifying the first testing ruleset to include the candidate rule based on inclusion of the candidate rule exceeding a threshold performance impact on the respective testing updates of the first and second testing rulesets, wherein the threshold performance impact is computed from the first and second differences, modifying, responsive to determining that the inclusion of the candidate rule exceeds the threshold performance impact on the respective testing updates of the first and second testing rulesets, the frequent pattern tree to include a sub-tree corresponding to the candidate rule, and deriving the class-specific optimized ruleset from the modified first testing ruleset; and providing, by the IDS generator, the optimized IDS to a machine-learning decision system that is configured to evaluate additional electronic data items for a data science application based on the optimized IDS.

2. The method of claim 1, wherein, for a second scoring term of the scoring objective function, the first difference and the second difference are calculated based on the itemset count indicated by the augmented frequent pattern tree and on a global itemset count based on the multiple classes of the electronic data items.

3. The method of claim 1, further comprising generating, for each class of the multiple classes of the electronic data items, at least one hash map that stores the support count or the itemset count for each candidate rule included in a respective class-specific candidate ruleset for the each class.

4. The method of claim 1, further comprising generating a global hash map that stores a global support count or a global itemset count of the electronic data items.

5. The method of claim 1, wherein determining a respective class-specific candidate ruleset for a respective class of the multiple classes of the electronic data items is based on:
a subset of the electronic data items corresponding to the respective class, wherein the subset of the electronic data items omits others of the electronic data items that do not meet a particular condition for the respective class, and
a respective occurrence threshold associated with the respective class.

6. The method of claim 1, wherein one or more of the class-specific candidate rulesets for the multiple classes of the electronic data items is determined via a parallel instance of frequent itemset mining implemented by the IDS generator.

7. A system comprising:
an interpretable decision set ("IDS") generator that generates an optimized IDS that includes a combination of class-specific optimized rulesets for multiple classes of electronic data items, wherein generating the optimized IDS includes:
determining class-specific candidate rulesets for the multiple classes of the electronic data items, respectively; and
generating the optimized IDS that includes the combination of class-specific optimized rulesets, wherein generating each class-specific optimized ruleset for a particular class of the multiple classes comprises,
generating, for the particular class, a frequent pattern tree having a support count for a candidate rule, the support count indicating a quantity of items associated with the candidate rule;
generating, for the particular class, an augmented frequent pattern tree having the support count and an itemset count for the candidate rule, the itemset count indicating a number of item sets that meet at least a respective condition indicated by the candidate rule,
calculating (i) a first difference between result values computed from a first testing ruleset associated with a class-specific candidate ruleset for the particular class and (ii) a second difference between result values computed from a second testing ruleset associated with the class-specific candidate ruleset for the particular class, wherein each of the first and second differences is determined from respective testing updates of the first and second testing rulesets based on an inclusion of the candidate rule, respectively, wherein, for a first scoring term of a scoring objective function, the first difference is calculated based on the support count indicated by the frequent pattern tree and the second difference is calculated based on the support count indicated by the augmented frequent pattern tree,
modifying the first testing ruleset to include the candidate rule based on inclusion of the candidate rule having a threshold performance impact on the respective testing updates of the first and second testing rulesets, wherein the threshold performance impact is computed from the first and second differences,
modifying, responsive to determining that the inclusion of the candidate rule exceeds the threshold performance impact on the respective testing updates of the first and second testing rulesets, the frequent pattern tree to include a sub-tree corresponding to the candidate rule, and
deriving the class-specific optimized ruleset from the modified first testing ruleset; and
a machine-learning decision system configured to receive the optimized IDS to evaluate additional electronic data items for a data science application based on the optimized IDS, wherein the optimized IDS is provided to the machine-learning decision system.

8. The system of claim 7, wherein, for a second scoring term of the scoring objective function, the first difference and the second difference are calculated based on the itemset count indicated by the augmented frequent pattern tree and on a global itemset count based on the multiple classes of the electronic data items.

9. The system of claim 7, wherein generating the optimized IDS further includes generating, for each class of the multiple classes of the electronic data items, at least one hash map that stores the support count or the itemset count for each candidate rule included in a respective class-specific candidate ruleset for the each class.

10. The system of claim 7, wherein generating the optimized IDS further includes generating a global hash map that stores a global support count or a global itemset count of the electronic data items.

11. The system of claim 7, wherein determining a respective class-specific candidate ruleset for a respective class of the multiple classes of the electronic data items is based on:
  a subset of the electronic data items corresponding to the respective class, wherein the subset of the electronic data items includes a first group of the electronic data items that meet a particular condition for the respective class and omits a second group of the electronic data items that do not meet the particular condition for the respective class, and
  a respective occurrence threshold associated with the respective class.

12. The system of claim 7, wherein one or more of the class-specific candidate rulesets for the multiple classes of the electronic data items is determined via a parallel instance of frequent itemset mining implemented by the IDS generator.

13. An interpretable decision set ("IDS") generator comprising:
  a class determination module for determining multiple classes of electronic data items, each class including a subset of the electronic data items that meet a condition having a particular attribute value;
  a frequent itemset mining ("FIM") module for determining, for each class in the multiple classes, a class-specific candidate ruleset, each candidate rule in the class-specific candidate ruleset indicating a respective additional condition for the class;
  a differential IDS module for iterating, for each particular candidate rule in the class-specific candidate ruleset for each particular class in the multiple classes, a differential analysis of the class-specific candidate ruleset, wherein each iteration of the differential analysis includes:
    generating, for the particular class, a frequent pattern tree having a support count for the particular candidate rule, the support count indicating a quantity of items associated with the particular candidate rule;
    generating, for the particular class, an augmented frequent pattern tree having the support count and an itemset count for the particular candidate rule, the itemset count indicating a number of item sets that meet at least the respective additional condition indicated by the particular candidate rule,
    calculating a first difference between a first pair of result values computed using a first testing ruleset associated with the class-specific candidate ruleset,
    calculating a second difference between a second pair of result values computed using a second testing ruleset associated with the class-specific candidate ruleset, wherein, for a first scoring term of a scoring objective function, the first difference is calculated based on the support count indicated by the frequent pattern tree and the second difference is calculated based on the support count indicated by the augmented frequent pattern tree,
    modifying, responsive to determining that a probability function computed from the first and second differences is greater than or equal to a threshold probability, the first testing ruleset to include the particular candidate rule, and
    modifying, responsive to the determining that the probability function is greater than the threshold probability, the frequent pattern tree to include a sub-tree corresponding to the particular candidate rule; and
  wherein the IDS generator is configured for (i) generating, for each class in the multiple classes, a respective class-specific optimized ruleset based on the modified first testing ruleset, and (ii) generating an optimized interpretable decision set that includes a combination of the respective class-specific optimized rulesets for the multiple classes.

14. The IDS generator of claim 13, wherein, for a second scoring term of the scoring objective function, the first difference and the second difference are calculated based on the itemset count indicated by the augmented frequent pattern tree and on a global itemset count based on the multiple classes of the electronic data items.

15. The IDS generator of claim 13, wherein the IDS generator is further configured for generating, for each class in the multiple classes, at least one hash map that stores the support count or the itemset count for each candidate rule in a respective class-specific candidate ruleset for the each class.

16. The IDS generator of claim 13, wherein the IDS generator is further configured for generating a global hash map that stores a global support count or a global itemset count of the electronic data items.

17. The IDS generator of claim 13, wherein determining the class-specific candidate ruleset for the particular class is based on:
  the subset of the electronic data items corresponding to the particular class, wherein the subset of the electronic data items omits others of the electronic data items that do not meet the condition for the class, and
  a respective occurrence threshold associated with the particular class.

* * * * *